US012273035B2

(12) United States Patent
Yang et al.

(10) Patent No.: US 12,273,035 B2
(45) Date of Patent: Apr. 8, 2025

(54) CONTROL CIRCUIT AND METHOD FOR USE IN STACKABLE MULTIPHASE POWER CONVERTER

(71) Applicant: Richtek Technology Corporation, Hsinchu (TW)

(72) Inventors: Ta-Yung Yang, Hsinchu (TW); Wei-Hsu Chang, Hsinchu (TW); Kuo-Chi Liu, Hsinchu (TW); Chao-Chi Chen, Hsinchu (TW)

(73) Assignee: Richtek Technology Corporation, Hsinchu (TW)

( * ) Notice: Subject to any disclaimer, the term of this patent is extended or adjusted under 35 U.S.C. 154(b) by 265 days.

(21) Appl. No.: 18/186,973

(22) Filed: Mar. 21, 2023

(65) Prior Publication Data

US 2024/0063720 A1     Feb. 22, 2024

Related U.S. Application Data

(63) Continuation-in-part of application No. 17/892,085, filed on Aug. 21, 2022, now Pat. No. 12,027,966.

(60) Provisional application No. 63/386,163, filed on Dec. 5, 2022.

(51) Int. Cl.
*H02M 1/088*     (2006.01)
*H02M 3/158*     (2006.01)

(52) U.S. Cl.
CPC ......... *H02M 3/1586* (2021.05); *H02M 1/088* (2013.01)

(58) Field of Classification Search
CPC .. H02M 1/084; H02M 1/0043; H02M 1/0041; H02M 3/158
See application file for complete search history.

(56) References Cited

U.S. PATENT DOCUMENTS

| 11,349,382 | B2 * | 5/2022 | Nakano | H02M 7/217 |
| 11,356,023 | B2 * | 6/2022 | Jiang | H02M 3/1584 |
| 11,387,736 | B2 * | 7/2022 | Luo | H02M 1/0003 |
| 11,831,242 | B2 * | 11/2023 | Wu | H02M 1/088 |
| 12,027,966 | B2 * | 7/2024 | Yang | H02M 1/0025 |

* cited by examiner

*Primary Examiner* — Adolf D Berhane
(74) *Attorney, Agent, or Firm* — Huan-Yi Lin

(57) ABSTRACT

A conversion control circuit controls plural stackable sub-converters which are coupled in parallel to generate an output power to a load, the conversion control circuit includes: a current sharing terminal, wherein a current sharing signal is configured to be connected to the current sharing terminals, in parallel, of the plurality of the conversion control circuits; and a current sharing circuit, configured to generate or receive the current sharing signal which is generated according to an output current of the output power; wherein the conversion control circuit adjusts the power stage circuit according to the current sharing signal for current sharing among the plural stackable sub-converters.

27 Claims, 27 Drawing Sheets

CONTROL CIRCUIT AND METHOD FOR USE IN STACKABLE MULTIPHASE POWER CONVERTER

CROSS REFERENCE

The present invention claims priority to following provisional applications, Ser. No. 63/386,163, filed on Dec. 5, 2022. This application is a continuation-in-part of U.S. patent application Ser. No. 17/892,085 filed Aug. 21, 2022. Both of the above applications are incorporated by reference herein.

BACKGROUND OF THE INVENTION

Field of Invention

The present invention relates to a stackable multiphase power converter; particularly, it relates to a stackable multiphase power converter. The present invention also relates to a conversion control circuit which is stackable for controlling the stackable multiphase power converter.

Description of Related Art

The stackable multiphase power converter provides high performance DC/DC power conversion for high load current and quick transient response requirements. Therefore, stackable multiphase power converters are widely used for CPU, GPU, AI in high performance computing (HPC) applications. The number of phases of the stackable multiphase power converter is increased when load current is increased. The number of phases is reduced during the light load for power saving.

FIG. 1 shows a prior art stackable multiphase power converter: U.S. Pat. No. 11,081,954 "Phase shedding control method used in multiphase switching converters with daisy chain configuration". The prior art uses a daisy chain configuration for stackable multiphase power converter.

The drawback of the daisy chain configuration shown in the prior art of FIG. 1 is poor fault tolerance and poor current sharing. Failure of any one of the conversion control circuits in the daisy chain will cause the whole power converter shutdown.

The present invention provides control circuit for controlling a stackable multiphase power converter with fewer control signals, simpler and more reliable approach and better current sharing than the prior art. The control signals of the present invention are connected to stackable control circuits of the stackable multiphase power converter in parallel without the daisy chain configuration.

SUMMARY OF THE INVENTION

From one perspective, the present invention provides a conversion control circuit for use in controlling a stackable multiphase power converter, wherein the stackable multiphase power converter includes plural stackable sub-converters, wherein each of the plural stackable sub-converters includes a power stage circuit and one corresponding conversion control circuit, wherein the plural power stage circuits of the plural stackable sub-converters are coupled in parallel to generate an output power to a load, wherein the conversion control circuit is configured to control the at least one switch of the power stage circuit for switching an inductor to generate the output power, the conversion control circuit comprising: a current sharing terminal, wherein a current sharing signal is configured to be connected to the current sharing terminals, in parallel, of the plurality of the conversion control circuits; and a current sharing circuit, configured to generate or receive the current sharing signal which is generated according to an output current of the output power; wherein the conversion control circuit adjusts the power stage circuit according to the current sharing signal for current sharing among the plural stackable sub-converters.

In one preferred embodiment, the conversion control circuit is configured as a master circuit or a slave circuit; wherein the master circuit is configured to generate the current sharing signal, and the slave circuit is configured to receive the current sharing signal.

In one preferred embodiment, the stackable sub-converter is a multi-level buck converter.

In one preferred embodiment, the stackable sub-converter is a three-level buck converter.

In one preferred embodiment, the conversion control circuit further comprising a reference voltage for regulating an output voltage of the output power; wherein the reference voltage of the slave circuit is adjusted for current sharing in accordance with the current sharing signal.

In one preferred embodiment, the reference voltage of the slave circuit is lower than the reference voltage of the master circuit before the reference voltage of the slave circuit is adjusted for current sharing.

In one preferred embodiment, the conversion control circuit further comprising a feedback divider, a reference voltage, an error amplifier, a ramp signal and a modulation comparator which are configured to form a feedback loop for regulating an output voltage of the output power; wherein an offset of the feedback divider or an input offset of the error amplifier is adjusted for current sharing in accordance with the current sharing signal.

In one preferred embodiment, the conversion control circuit further comprises: a synchronization terminal, wherein a synchronization signal is configured to be connected to the synchronization terminals, in parallel, of the plurality of the conversion control circuits; wherein the synchronization signal includes a plurality of pulses to be successively counted as a count number, wherein the synchronization signal includes a reset signal which is configured to reset and initiate the count number; wherein the conversion control circuit enables the power stage circuit to generate the output power when the count number is correlated to a phase-sequence number of the conversion control circuit; wherein the master circuit is configured to generate the synchronization signal through the synchronization terminal, and the slave circuit is configured to receive the synchronization signal through the synchronization terminal.

In one preferred embodiment, the conversion control circuit further comprises a current-sense circuit which is configured to generate a current-sense signal according the output current of the sub-converter; wherein the current-sharing signal is equal to the current-sense signal of the master circuit.

In one preferred embodiment, the conversion control circuit further comprising an identification terminal for setting the phase-sequence number, wherein the phase-sequence number is determined according to an electrical parameter level on the identification terminal.

In one preferred embodiment, the conversion control circuit is further determined to operate as a master circuit or a slave circuit according to the phase-sequence number.

In one preferred embodiment, the conversion control circuit further comprising a constant current source which is coupled to a resistor through the identification terminal, wherein the phase-sequence number is determined according to a voltage level of the identification terminal.

In one preferred embodiment, a pulse, having a higher voltage level, of the synchronization signal represents the reset signal.

In one preferred embodiment, the reset signal is generated when the count number reaches an activated phase number, wherein the activated phase number is increased in response to the increase of a load current consumed by the load.

In one preferred embodiment, the stackable sub-converter is triggered on in response to a corresponding pulse of the synchronization signal.

In one preferred embodiment, the conversion control circuit of the three-level buck converter generates a pulse width modulation (PWM) signal to control the power stage circuit for generating the output power, wherein the conversion control circuit adjusts the pulse-width of the PWM signal to balance the voltage of the a flying capacitor of the three-level buck converter to be a half value of an input voltage of the stackable multiphase power converter.

In one preferred embodiment, the stackable sub-converter is operated in a current mode control.

In one preferred embodiment, stackable multiphase power converter is operated in a fixed switching frequency during a heavy load condition.

In one preferred embodiment, the conversion control circuit is configured as an integrated circuit and the synchronization terminal corresponds to a synchronization pin of the integrated circuit and the current sharing terminal corresponds to a current sharing pin of the integrated circuit.

From another perspective, the present invention provides a method for controlling a stackable multiphase power converter, wherein the stackable multiphase power converter includes plural stackable sub-converters, wherein each of the plural stackable sub-converters includes a power stage circuit and a conversion control circuit, wherein the plural power stage circuits of the plural stackable sub-converters are coupled in parallel to generate an output power to a load, wherein the power stage circuits includes at least one switch for switching an inductor for generating the output power, wherein one of the plural stackable sub-converters is configured as a master stackable sub-converter and another of plural stackable sub-converters is configured as a slave stackable sub-converter, the method comprising: controlling the at least one switch of the power stage circuit for switching the corresponding inductor; generating a current sharing signal by the master stackable sub-converter according to an output current of the output power; receiving the current sharing signal by the slave stackable sub-converter; and adjusting the power stage circuit according to the current sharing signal for current sharing among the plural stackable sub-converters.

In one preferred embodiment, the method further comprising: generating a reference voltage for regulating an output voltage of the output power; and adjusting the reference voltage of the slave stackable sub-converter for current sharing in accordance with the current sharing signal.

In one preferred embodiment, the reference voltage of the slave stackable sub-converter is lower than the reference voltage of the master stackable sub-converter before the reference voltage of the slave stackable sub-converter is adjusted for current sharing.

In one preferred embodiment, the method further comprising a feedback divider, a reference voltage, an error amplifier, a ramp signal and a modulation comparator which are configured to form a feedback loop for regulating an output voltage of the output power, the method further comprising: offsetting the feedback divider or an input offset of the error amplifier of the slave stackable sub-converter for current sharing in accordance with the current sharing signal.

In one preferred embodiment, the method further comprising: generating a synchronization signal by the master stackable sub-converter; receiving the synchronization signal by the slave stackable sub-converter; wherein the synchronization signal includes a plurality of pulses to be successively counted as a count number, wherein the synchronization signal includes a reset signal which is configured to reset and initiate the count number; enabling a corresponding power stage circuit to generate the output power when the count number is correlated to a corresponding phase-sequence number.

In one preferred embodiment, the method further comprising: generating a current-sense signal according the output current of the sub-converter; wherein the current-sharing signal is equal to the current-sense signal of the master stackable sub-converter.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
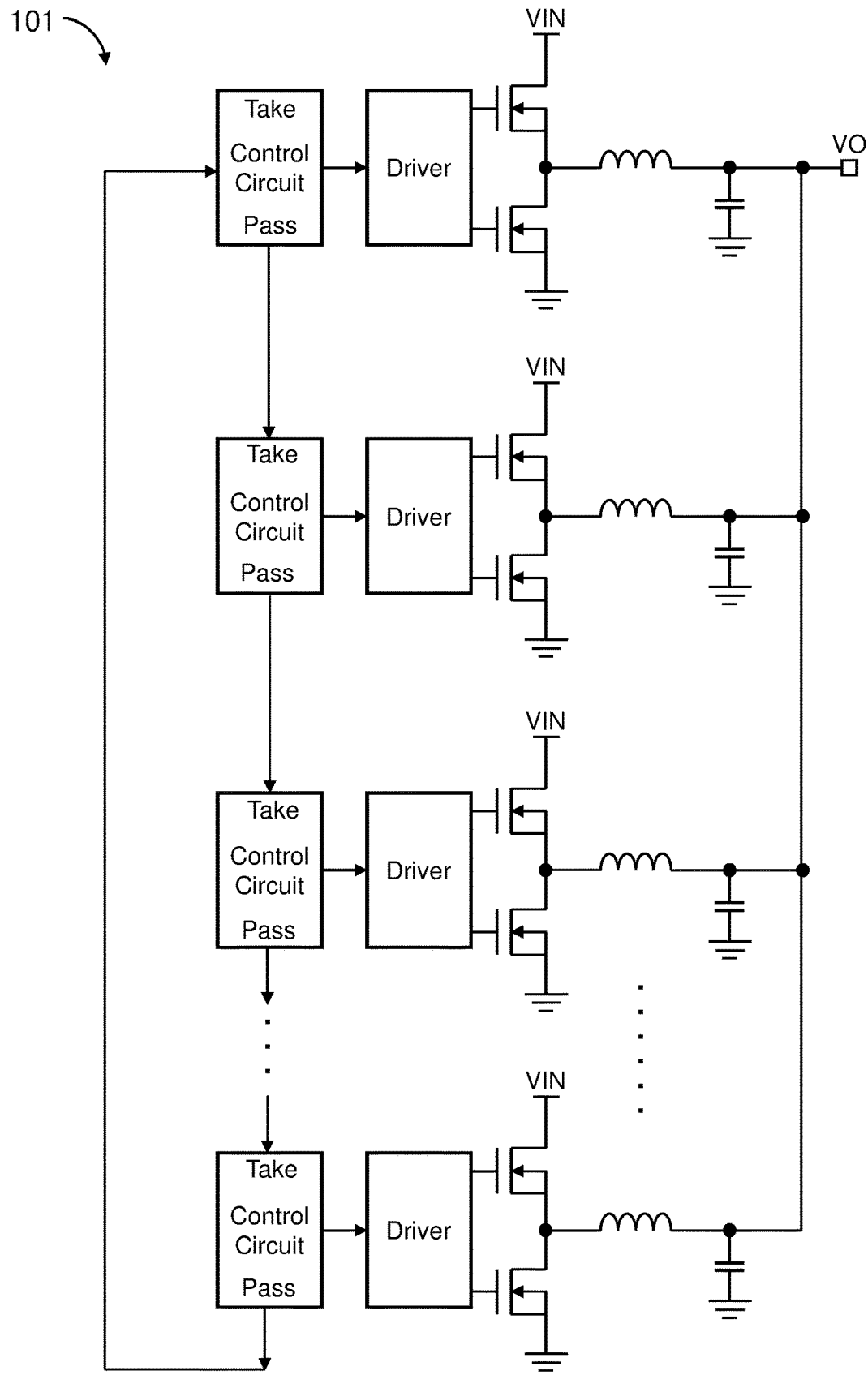
FIG. 1 shows a prior art stackable multiphase power converter.
Figure 2A:
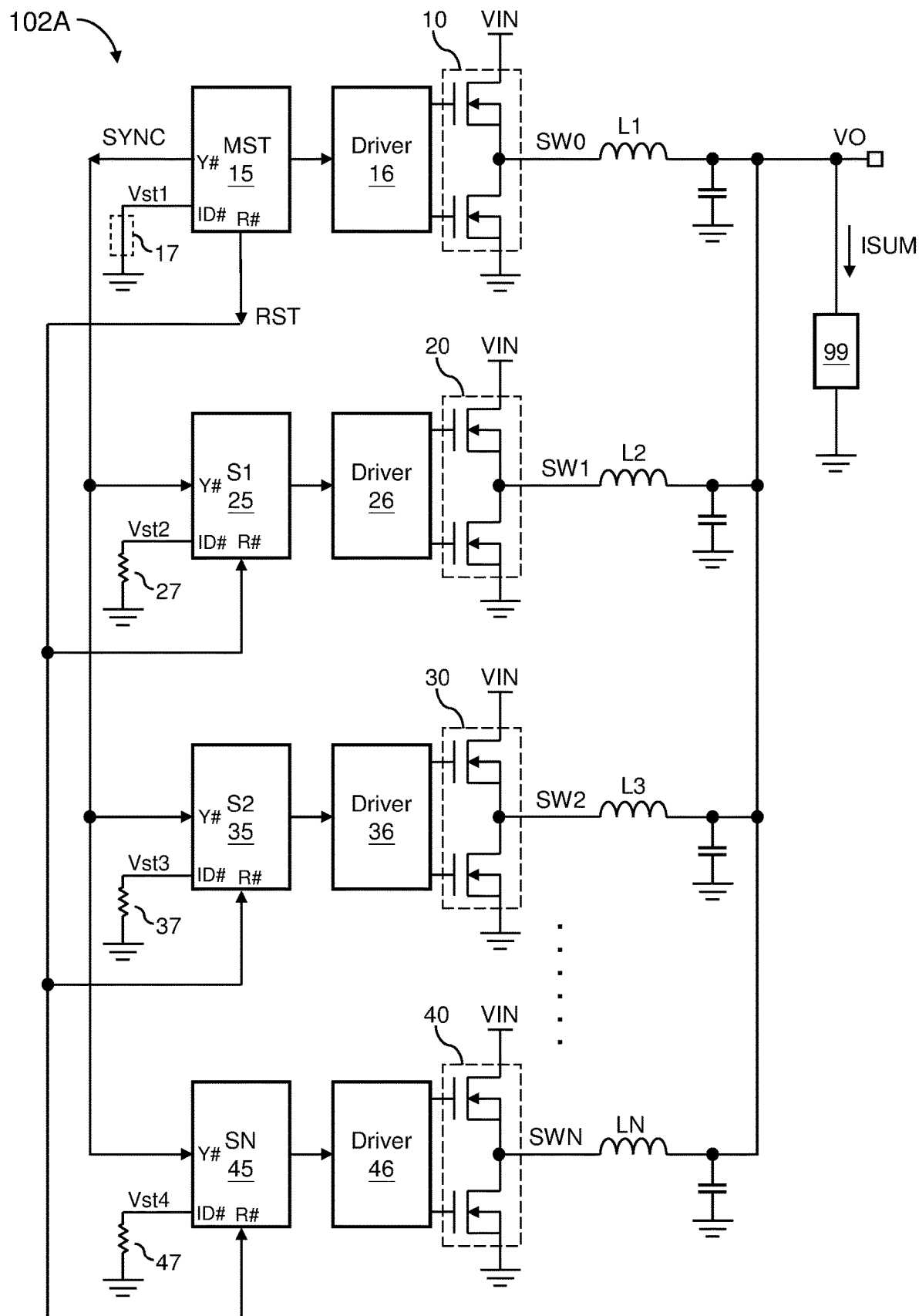
FIG. 2A shows a schematic diagram of one preferred embodiment of the stackable multiphase power converter according to the present invention.

FIG. 2A shows a schematic diagram of one preferred embodiment of the stackable multiphase power converter according to the present invention. The stackable multiphase power converter 102A comprises power stage circuits 10, 20, 30 and 40 which are connected in parallel to generate an output power (e.g. corresponding to the output voltage VO) to a load 99. In one embodiment, the power stage circuits 10, 20, 30 and 40 operate in interleaving phases. More specifically, the power stage circuits 10, 20, 30 and 40 are configured to switch the inductors L1, L2, L3 and LN for interleaving switching power conversion, wherein N is an integer larger than 1.

In one embodiment, the power stage circuit is a buck converter. However, this is not for limiting the scope of the present invention. The power stage circuit can alternatively be other switching power converters such as boost, buck-boost, flyback power converters.

The stackable multiphase power converter further comprises stackable control circuits 15, 25, 35 and 45 which are configured to control switches of corresponding power stage circuits 10, 20, 30 and 40 respectively. In one embodiment, the stackable multiphase power converter further comprises corresponding number of drivers (16, 26, 36, 46), wherein each driver is connected between the corresponding control circuit and the power stage circuit for driving the switches.

In one embodiment, each of the conversion control circuits 15, 25, 35 and 45 is programmable to operate as a master circuit or a slave circuit and the interleaving phase sequence number is also programmable. Still referring to FIG. 2A, in one embodiment, each of the conversion control circuits 15, 25, 35, 45 includes an identification terminal ID # for setting the phase-sequence number ID_N. In one embodiment, a resistor collaborating with a constant current source of the conversion control circuit determines the phase-sequence number ID_N for the conversion control circuit. Resistor 17, 27, 37, 47 are connected to the conversion control circuit 15, 25, 35, 45 respectively for the setting of the sequence number ID_N of the corresponding control circuit. The phase-sequence number ID_N is determined according to the voltage level at the identification terminal ID #. In one embodiment, the voltage on the identification terminal ID # of the conversion control circuit (e.g. Vst1, Vst2, Vst3 and Vst4) is detected to determine the corresponding phase-sequence number ID_N.

In one embodiment, the identification terminal ID # of the conversion control circuit 15 is connected to the ground to set its phase-sequence number ID_N as 0 (i.e. the resistor 17 can be omitted as a short circuit). In one embodiment, the phase-sequence number ID_N further determines the conversion control circuit to operate as a master circuit or a slave circuit. In one embodiment, the identification terminal ID # of the conversion control circuit 15 is connected to the ground to set its phase-sequence number ID_N as 0 to program the conversion control circuit 15 to operate as master circuit which is noted as MST. In one embodiment, the relationship of the resistance R27, R37, R47 of the resistors 27, 37, 47 is R27<R37<R47, which sets the phase-sequence number ID_N of the conversion control circuit 25, 35, 45 as 1, 2, 3. In one embodiment, the phase-sequence numbers ID_N other than 0 (the master) also determines the conversion control circuits (e.g. 25, 35, 45) as slave circuits (noted as S1, S2 and SN respectively).

Still referring to FIG. 2A, in one embodiment, each of the conversion control circuits 15, 25, 35, 45 includes a synchronization terminal Y # which is configured for transmitting and receiving a synchronization signal SYNC through.

In one embodiment, all the synchronization terminals (i.e. Y # of the conversion control circuits 15, 25, 35 or 45) are connected together, or are connected in parallel in another perspective. In one embodiment, the master circuit (e.g. the conversion control circuit 15) generates and transmits the synchronization signal SYNC through the corresponding synchronization terminal Y #. On the other hand, the slave circuit (e.g. the conversion control circuit 25, 35 or 45) is configured to receive the synchronization signal SYNC through the respective corresponding synchronization terminal Y #.

Still referring to FIG. 2A, in one embodiment, each of the conversion control circuits 15, 25, 35, 45 includes a reset terminal R # which is configured for transmitting and receiving a reset signal RST through.

In one embodiment, all the reset terminals (i.e. R # of the conversion control circuits 15, 25, 35 or 45) are connected together, or are connected in parallel in another perspective. In one embodiment, the master circuit (e.g. the conversion control circuit 15) generates and transmits the reset signal RST through the corresponding reset terminal R #. On the other hand, the slave circuit (e.g. the conversion control circuit 25, 35 or 45) is configured to receive the reset signal RST through the respective corresponding reset terminal R #.

Figure 2B:
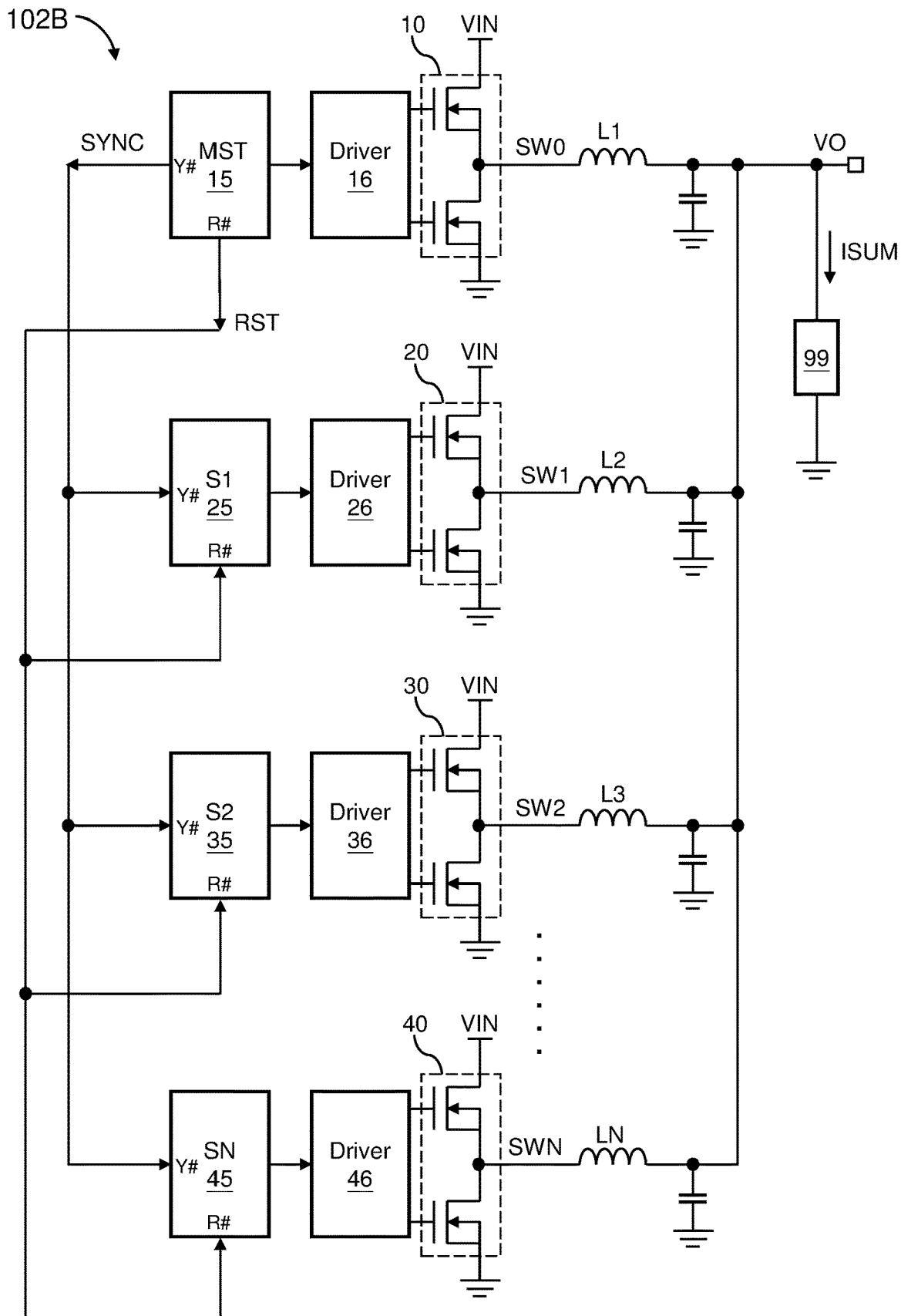
FIG. 2B shows a schematic diagram of another preferred embodiment of the stackable multiphase power converter according to the present invention.

FIG. 2B shows a schematic diagram of another preferred embodiment of the stackable multiphase power converter according to the present invention. The stackable multiphase power converter 102B is similar to the stackable multiphase power converter 102A and differs in that the identification terminal ID # of the conversion control circuit in the stackable multiphase power converter 102B is omitted. In this embodiment, the sequence number ID_N can be set by other means, such as preprogramed one-time or multiple time programmable memory circuit, or digital communication interfaces (e.g. I²C).

Figure 2C:
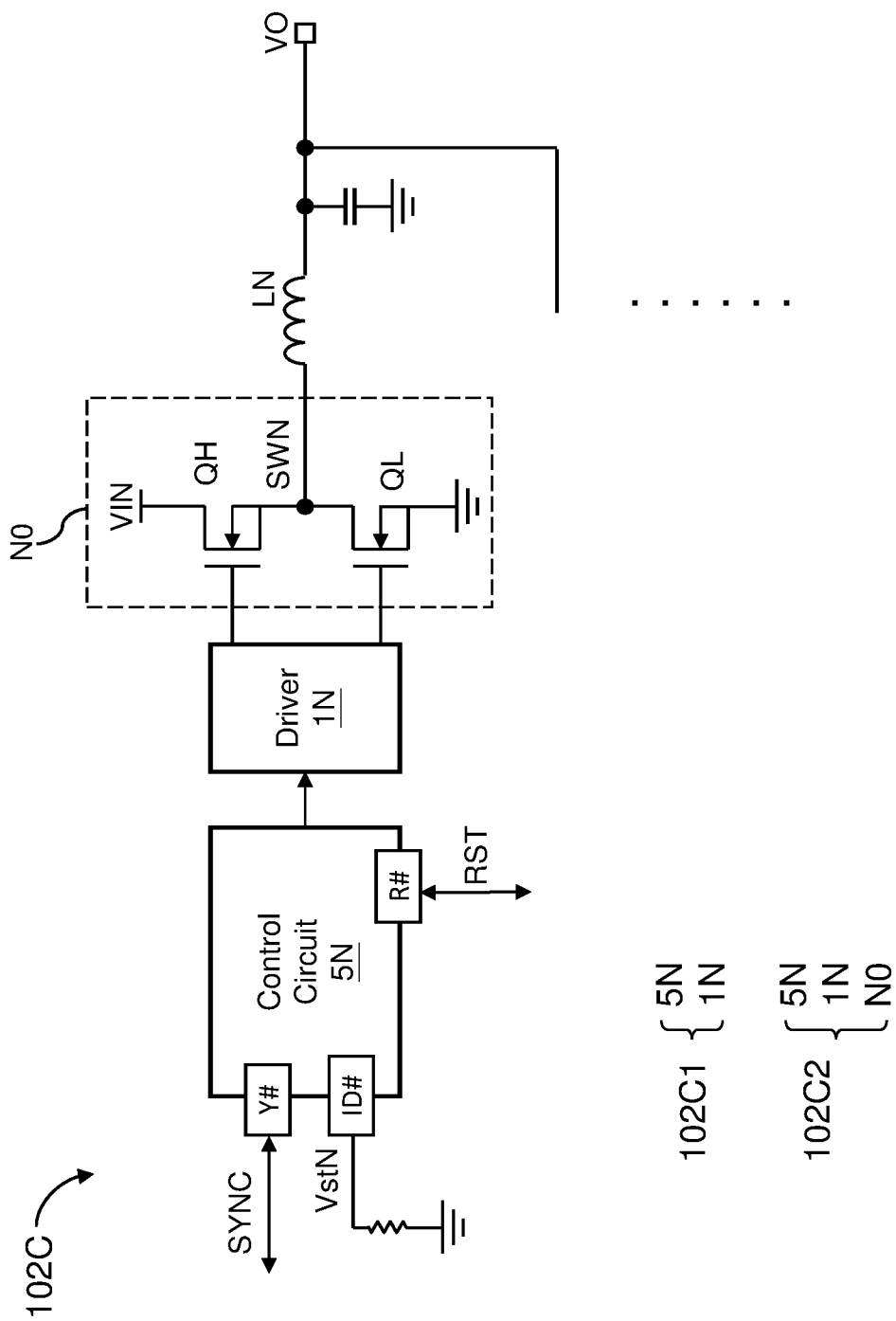
FIG. 2C shows a more specific schematic diagram of a stackable sub-converter of the stackable multiphase power converter.

FIG. 2C shows a more specific schematic diagram of a stackable sub-converter 102C of the stackable multiphase power converter. A stackable sub-converter is in charge of a phase of power delivering of the stackable multiphase power converter. A plurality of the stackable sub-converters are coupled as shown in FIG. 2A to form the stackable multiphase power converter.

In one embodiment, the conversion control circuit (e.g. 5N) is integrated in an integrated circuit. In one embodiment, the conversion control circuit (e.g. 5N) and the driver (e.g. 1N) can be integrated in an integrated circuit (e.g. 102C1). In one embodiment, the conversion control circuit, the driver and the power stage circuit (e.g. NO) can be integrated in an integrated circuit (e.g. 102C2).

Figure 3:
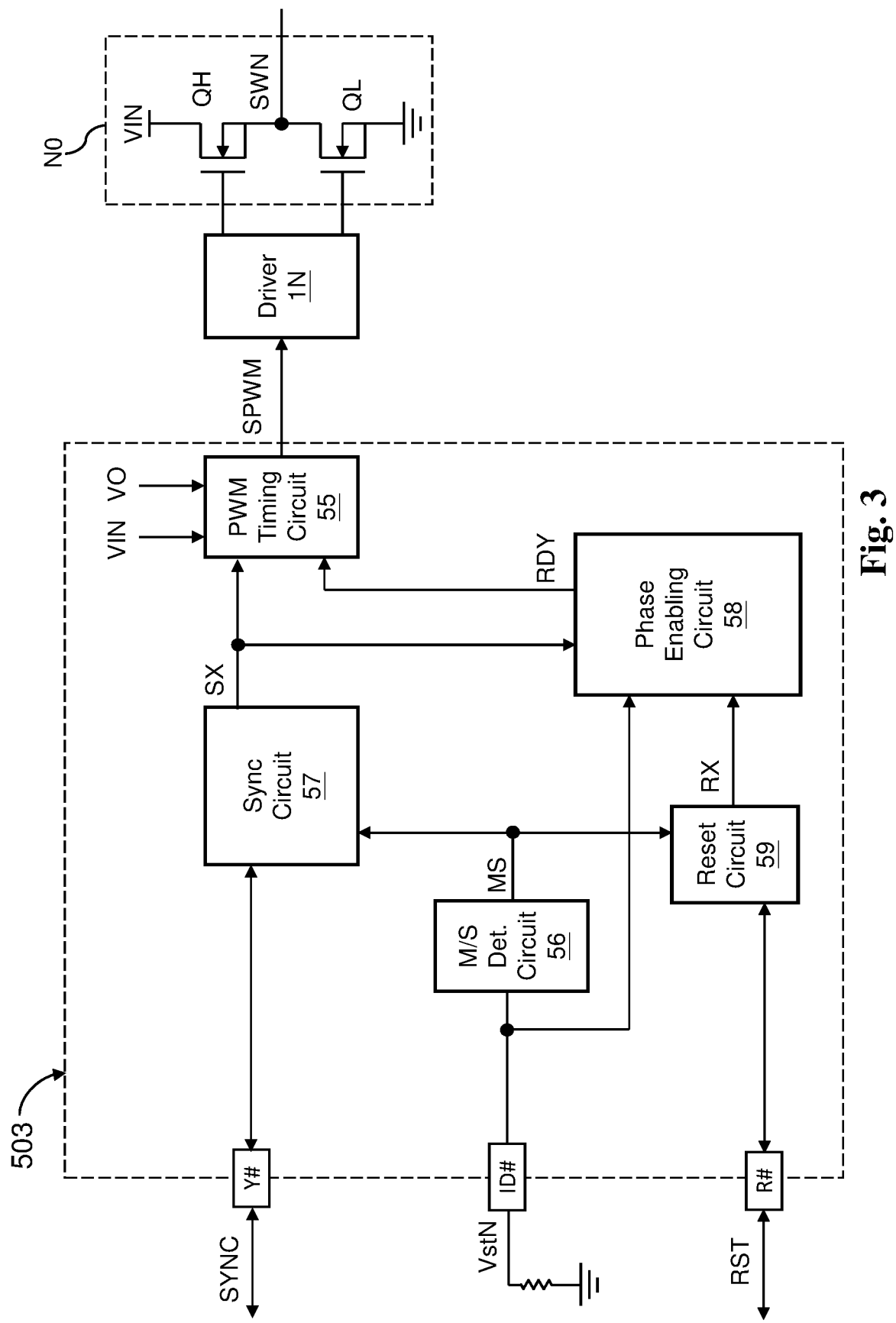
FIG. 3 shows a specific block diagram of the conversion control circuit according to one preferred embodiment (FIG. 2A) of the present invention.

FIG. 3 shows a specific block diagram of the conversion control circuit according to one preferred embodiment (FIG. 2A) of the present invention. In this embodiment, the conversion control circuit 503 includes a master-slave determination circuit (noted as M/S det. circuit 56), a sync circuit 57, a phase enabling circuit 58, a reset circuit 59 and a pulse width modulation (PWM) timing circuit 55.

The M/S det. circuit 56 generates a master signal MS for indicating the conversion control circuit 503 as a master circuit or a slave circuit according to the voltage VstN on the identification terminal ID # of the conversion control circuit 503. In one embodiment, the enabling state represents a master circuit. The reset circuit generates a local-reset signal RX according to the reset signal RST, wherein when the conversion control circuit is configured as a master circuit (e.g. indicated by the enabling state of the master signal MS, the same hereinafter), the reset circuit 59 generates the reset signal RST through the reset terminal R #. When the conversion control circuit 503 is configured as a slave circuit (also indicated by the disabling state of the master signal MS, the same hereinafter), the reset circuit 59 receives the reset signal RST through the reset terminal R #.

The sync circuit 57 generates a local-sync signal SX according to the synchronization signal SYNC. When the conversion control circuit is configured as a master circuit, the sync circuit 57 generates the synchronization signal SYNC through the synchronization terminal Y #. When the conversion control circuit 503 is configured as a slave circuit), the sync circuit 57 receives the synchronization signal SYNC through the synchronization terminal Y #.

The phase enabling circuit 58 generates a ready signal RDY according to the local-reset signal RX, the voltage VstN on the identification terminal ID #, the local-sync signal SX and the master signal MS. The PWM timing circuit generates a PWM control signal SPWM according to the local-sync signal SX and the ready signal RDY. Driver 1N drives the high side switch QH and the low side switch QL according to the PWM control signal SPWM.

Figure 4:
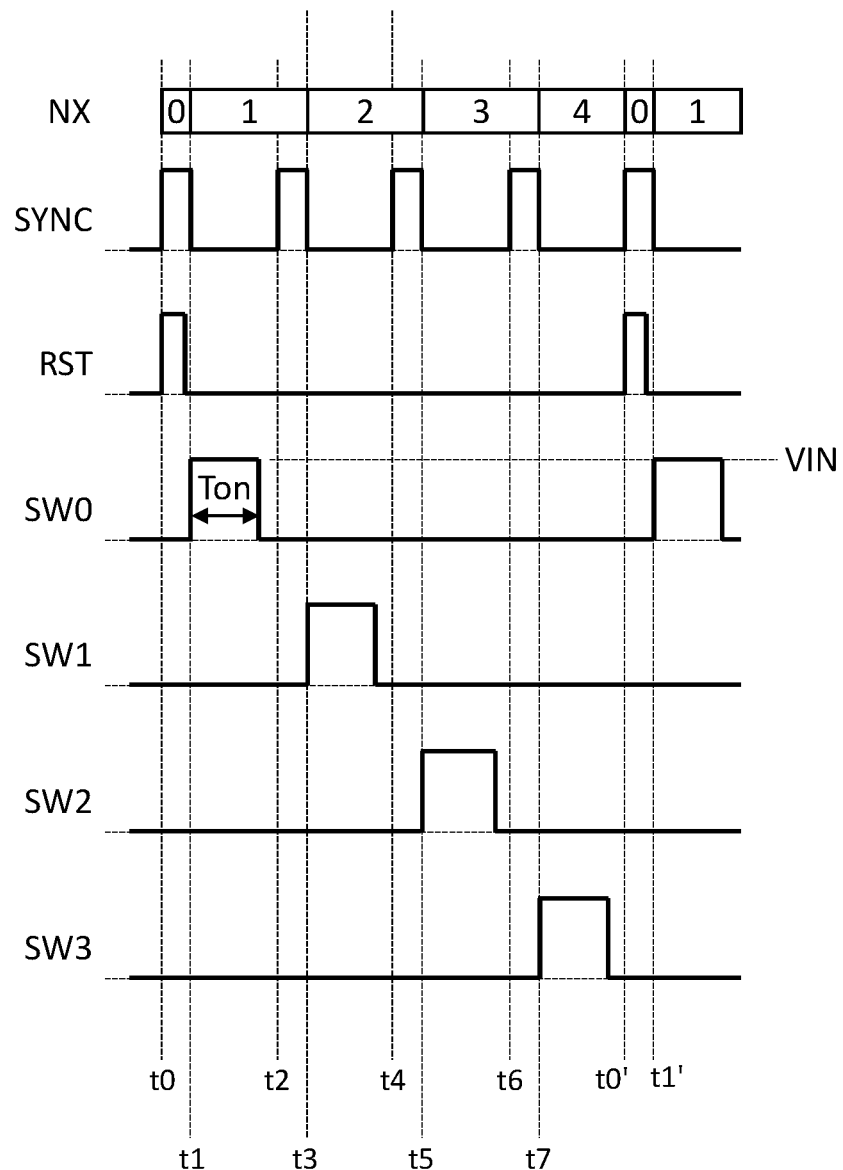
FIG. 4 shows waveforms of the stackable 4-phase power converter shown in FIG. 2A according to the preferred embodiment of the present invention.

FIG. 4 shows waveforms of the stackable 4-phase power converter shown in FIG. 2A according to the preferred embodiment of the present invention. In one embodiment, the synchronization signal SYNC includes a plurality of pulses to successively generate a count number NX in the conversion control circuit. In one embodiment, each control circuit enables the corresponding power stage circuit to generate the output power to the load 99 when the count number NX is correlated to the phase-sequence number ID_N. For example, in one preferred embodiment, each control circuit enables the corresponding power stage circuit to generate the output power to the load 99 when the count number NX is equal to the phase-sequence number ID_N.

In this embodiment, the reset signal RST is configured to reset and initiate the count number NX in every multiphase cycle, which secures a robust configuration of the stackable multiphase power converter according to the present invention.

Still referring to FIG. 4, in one specific embodiment, a ready signal RDY is enabled when the count number NX is correlated to the phase-sequence number ID_N, and the conversion control circuit enables the corresponding power stage circuit to generate the output power to the load 99 when the ready signal RDY is enabled.

In this embodiment, the phase-sequence number ID_N of the conversion control circuits 15, 25, 35, 45 is set as 0, 1, 2, 3 respectively. Still referring to FIG. 4, the operations of the stackable multiphase power converter 102A are explained as below.

t0: The synchronization signal SYNC and the reset signal RST are generated (e.g. by the conversion control circuit 15), the count number NX of each of the conversion control circuits 15, 25, 35, 45 is reset to 0.

t1: Since the count number NX is 0 and is equal to the phase-sequence number ID_N of the conversion control circuits 15, the falling edge of the synchronization signal SYNC triggers the conversion control circuit 15 to enable the power stage circuit 10 to generate the output power to the load 99, for example by controlling the high side switch of the power stage circuit 10 to be conductive such that the switching node SW0 is electrically connected to the input voltage VIN for an on time period Ton. Meanwhile, the falling edge of the synchronization signal SYNC increase the count number NX to 1. Note that the on time Ton is determined by the PWM timing circuit 55.

t2: The rising edge of the synchronization signal SYNC latches the status of the ready signal RDY. Because the phase-sequence number ID_N of the conversion control circuit 25 is set as 1, the ready signal RDY of the control 25 is enabled.

t3: The falling edge of the synchronization signal SYNC triggers the conversion control circuit 25 (the count number NX=1) to enable the power stage circuit 20 to generate the output power to the load 99, for example by controlling the high side switch of the power stage circuit 20 to be conductive such that the switching node SW1 is electrically connected to the input voltage VIN for an on time period Ton. Meanwhile, the falling edge of the synchronization signal SYNC increase the count number NX to 2.

t4: The rising edge of the synchronization signal SYNC latches the status of the ready signal RDY. Because the phase-sequence number ID_N of the conversion control circuit 35 is set as 2, the ready signal RDY of the control 35 is enabled.

t5: The falling edge of the synchronization signal SYNC triggers the conversion control circuit 35 (the count number NX=2) to enable the power stage circuit 30 to generate the output power to the load 99, for example by controlling the high side switch of the power stage circuit 30 to be conductive such that the switching node SW2 is electrically connected to the input voltage VIN for an on time period Ton. Meanwhile, the falling edge of the synchronization signal SYNC increase the count number NX to 3.

t6: The rising edge of the synchronization signal SYNC latches the status of the ready signal RDY. Because the phase-sequence number ID_N of the conversion control circuit 45 is set as 3, the ready signal RDY of the control 45 is enabled.

t7: The falling edge of the synchronization signal SYNC triggers the conversion control circuit 45 (the count number NX=3) to enable the power stage circuit 40 to generate the output power to the load 99, for example by controlling the high side switch of the power stage circuit 40 to be conductive such that the switching node SW3 is electrically connected to the input voltage VIN for an on time period Ton. Meanwhile, the falling edge of the synchronization signal SYNC increase the count number NX to 4.

The reset signal RST is generated when the count number NX is equal to or higher than a maximum number. In this embodiment, the maximum number is 4. Therefore, the reset signal RST is triggered to reset the counter at the rising edge of the synchronization signal SYNC when the count number NX is 4 (e.g. at t0').

In one embodiment, although the synchronization signal SYNC and the reset signal RST are generated simultaneously, the pulse width of the reset signal RST is shorter then pulse width of the synchronization signal SYNC.

In one embodiment, the reset signal RST is further generated when the count number NX reaches an activated phase number IX. The activated phase number IX is increased in response to the increase of the load current ISUM of the load 99. Taking the 4-phase power converter as shown in FIG. 4 as an example, when the load current ISUM is lower to an extent, the activated phase number IX will be reduced from 4 (the maximum phase number of the 4-phase power converter) to 3. In this case, the fourth phase stackable sub-converter (i.e. the conversion control circuit 45 and the power stage circuit 40) is shed and ceases switching, and the first, the second the third phase stackable sub-converters (i.e. the conversion control circuit 15, 25, 35 and the power stage circuit 10, 20, 30) keep operating and switching to generate the output power to the load. The activated phase number IX can be further reduced to 2 or 1 according to the level of the load current ISUM.

Figure 5:
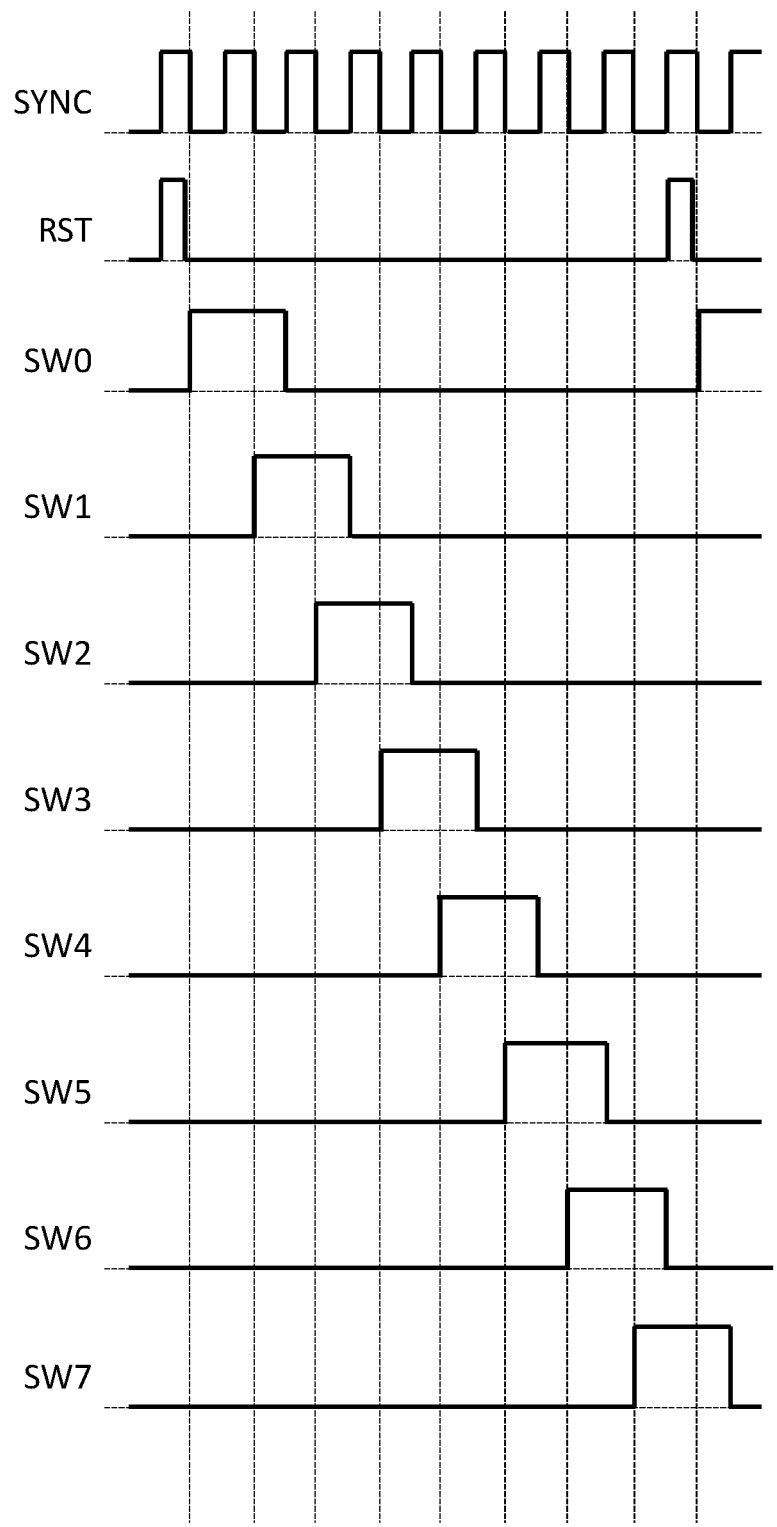
FIG. 5 shows switching waveforms of one preferred embodiment of an 8-phase power converter utilizing the stackable control circuits according to the present invention.

The total phase number (maximum phase) in a stackable multiphase power converter utilizing the stackable control circuits according to the present invention can be any positive integer. FIG. 5 shows switching waveforms of one preferred embodiment of an 8-phase power converter utilizing the stackable control circuits according to the present invention. The 8-phase power converter utilizes 8 control circuits which are configured similar to FIG. 2 with N=8 to control corresponding numbers of power stage circuits to generate the output power to the load. Note that the ON time periods of the multiple-phases switches can be non-overlapped (e.g. SW0-SW3 shown in FIG. 4) or overlapped (e.g. as the voltages SW0-SW7 on the switching node shown in FIG. 5), which is determined according to the feedback control loop of the output power and the corresponding control circuit and the power stage circuit.

In one embodiment, the stackable multiphase power converter (e.g. 102A, 102B in FIG. 2A, FIG. 2B and FIG. 4, or FIG. 5) is a constant on-time (COT) power converter. The multiphase COT power converter (e.g. 102A) is triggered on in response to the pulse of the synchronization signal SYNC. More specifically, in one embodiment, each phase of the stackable sub-converter (i.e. one control circuit collaborating a corresponding power stage circuit) is a constant on-time (COT) power converter, and is triggered on (e.g. the corresponding high side switch of the power stage circuit) in response to the corresponding pulse, correlated to the phase-sequence number ID_N, of the synchronization signal SYNC.

Figure 6:
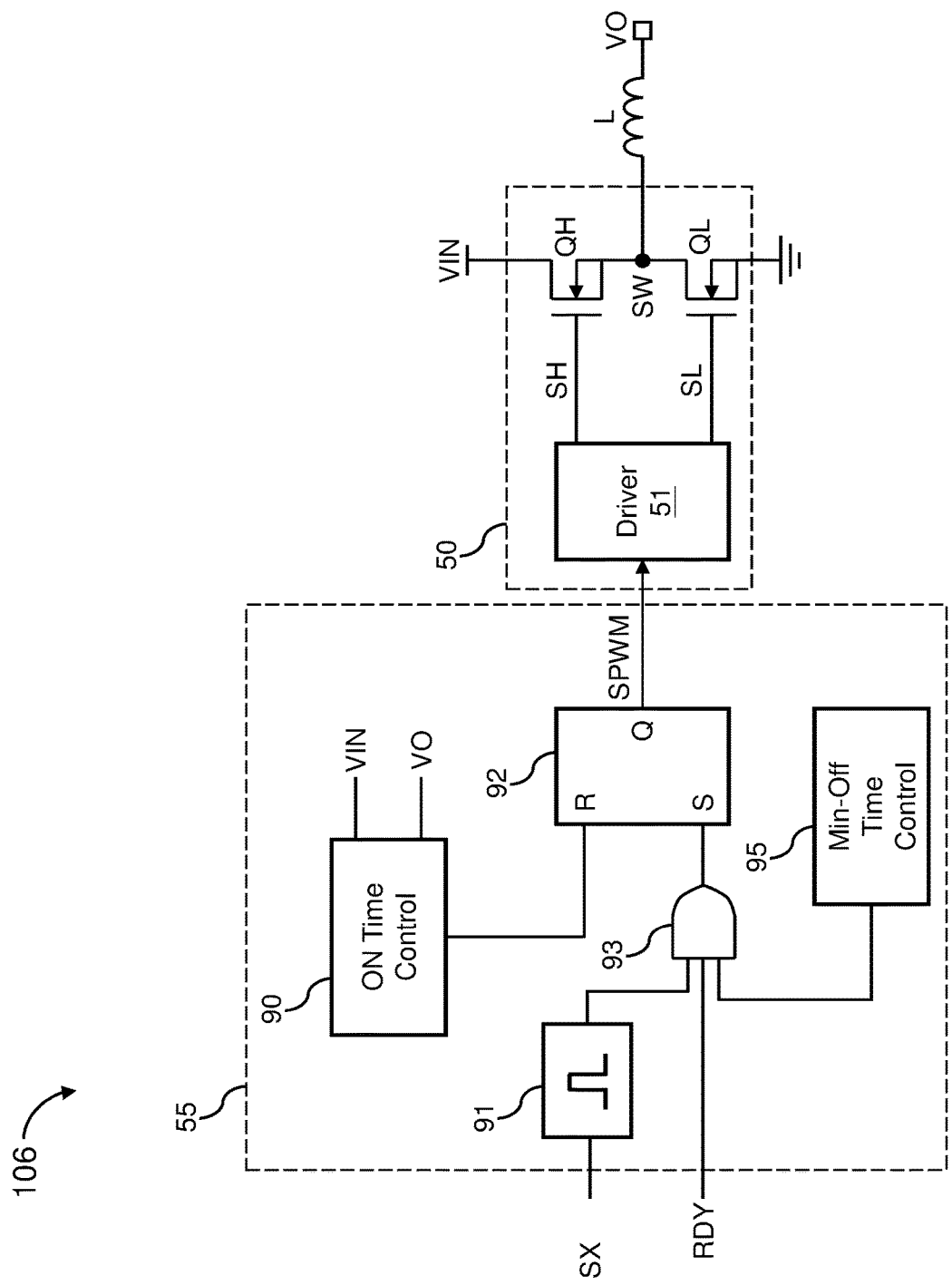
FIG. 6 shows a schematic diagram of a preferred embodiment of the stackable sub-converter and the PWM timing circuit of the stackable multiphase power converter in accordance with the present invention.

FIG. 6 shows a schematic diagram of a preferred embodiment of the stackable sub-converter (106) and the PWM timing circuit (55) of the stackable multiphase power converter in accordance with the present invention. The PWM timing circuit 55 of the conversion control circuit controls the power stage circuit 50. In one embodiment, the PWM timing circuit 55 includes an on-time timer circuit 90 (noted as ON time Control 90), a one-shot pulse generator 91, a latch circuit 92, an AND gate 93 and a minimum off-time timer circuit 95 (noted as Min-Off time control 95).

The on-time timer circuit 90 controls the on-time Ton of the switching signal SW (such as SW0 as shown in FIG. 4) once the PWM control signal SPWM is triggered on (e.g. for controlling the high side switch QH on and controlling the low side switch QL). In one embodiment, the on-time Ton is decreased in response to the increase of the input voltage VIN of the stackable multiphase power converter. In one embodiment, the on-time Ton is increased in response to the increase of the output current of the load 99 for further improving the load transient response. A minimum off-time timer circuit 95 provides a minimum off time for the PWM control signal SPWM (also the switching node signal SW). Once the ready signal RDY is enabled, a local-sync signal SX turns on the high side switch through a one-shot pulse generator 91. The local-sync signal SX is generated in response to the falling edge of the corresponding pulse of the synchronization signal SYNC.

Figure 7:
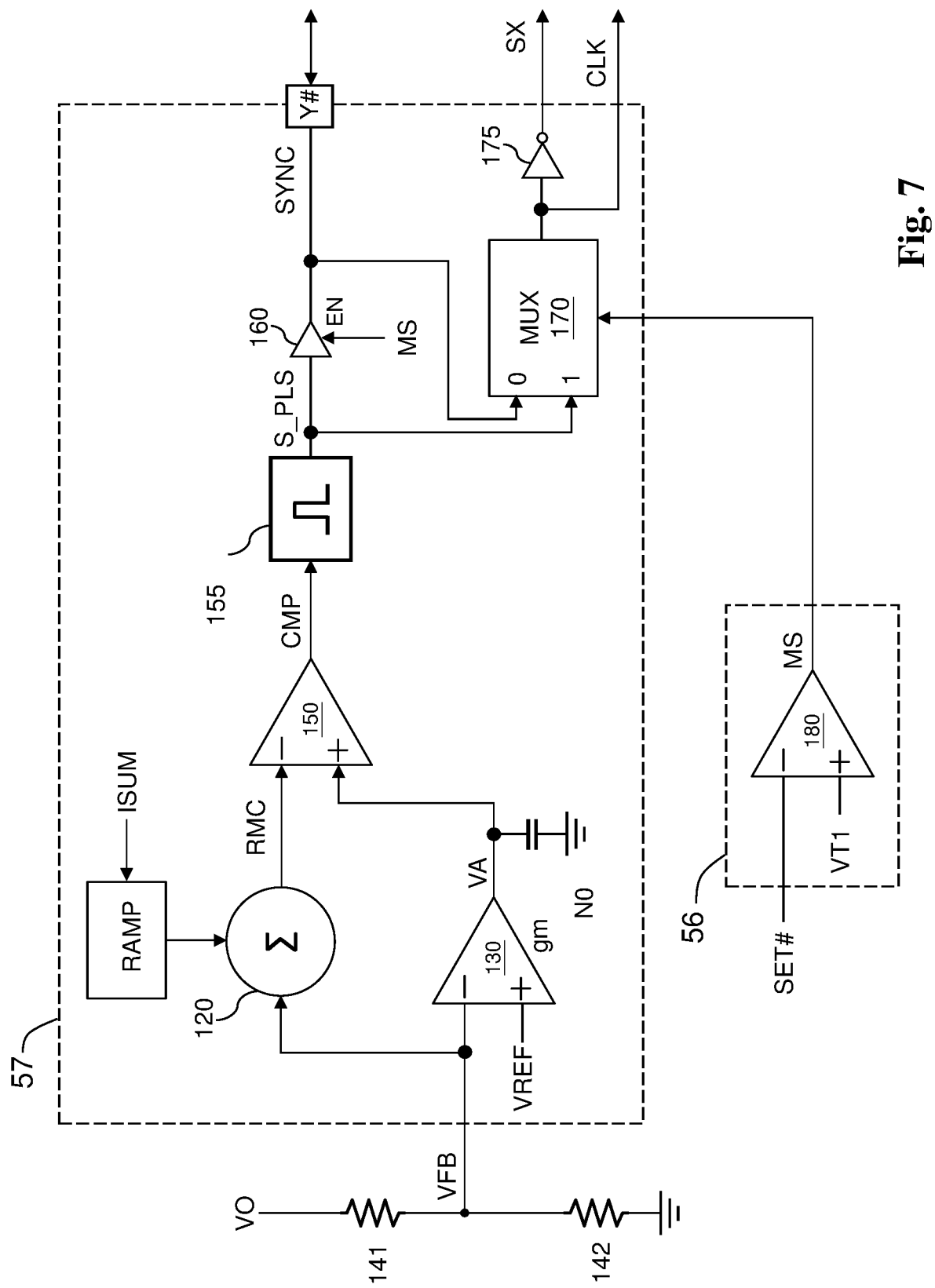
FIG. 7 shows a schematic diagram of a sync circuit for generating the synchronization signal in accordance with a preferred embodiment of the present invention.

FIG. 7 shows a schematic diagram of a sync circuit 57 for generating the synchronization signal SYNC in accordance with a preferred embodiment of the present invention. Resistors 141, 142 form a voltage-divider which generates a feedback voltage VFB in accordance with the output power (e.g. output voltage VO). An error amplifier 130 (e.g. a trans-conductance amplifier) is configured to generate an amplified signal VA by amplifying the difference between a reference voltage VREF and the feedback voltage VFB. The feedback voltage VFB is summed with a ramp signal RAMP to generate a combined ramp signal RMC. The combined ramp signal RMC is coupled to a comparator 150 to compare with the amplified signal VA to generate a comparison signal CMP. In one embodiment, the ramp signal RAMP is generated according to current signal ISUM (corresponding to the load current) which is a summation of the inductor currents of all phases of the stackable multiphase power converter.

The comparison signal CMP triggers the one-shot pulse generator 155 to generate a sync-generation signal S_PLS. The sync-generation signal S_PLS is buffered by a buffer 160.

The M/S det. circuit 56 includes a comparator 180 for generating the master signal MS when the voltage of the identification terminal ID # is lower than a threshold voltage VT1 (such as 0.5V). When the conversion control circuit is configured as a master circuit, the master signal MS enables the buffer 160 to output the synchronization signal SYNC through the sync terminal Y #. The pulse width of the sync-generation signal S_PLS determines the pulse width of the synchronization signal SYNC.

The synchronization signal SYNC and the sync-generation signal S_PLS are selected by a multiplexer 170 for generating the local-sync signal SX and a clock signal CLK in accordance with the control of the master signal MS. When the conversion control circuit is configured as a slave circuit, the multiplexer 170 selects the synchronization signal SYNC through the sync terminal Y # for generating the local-sync signal SX and the clock signal CLK. The clock signal CLK is related to the rising edge of the synchronization signal SYNC. From one perspective, the clock signal CLK is identical to the synchronization signal SYNC. In one embodiment, when the conversion control circuit is configured as a master circuit, the multiplexer 170 selects the sync-generation signal S_PLS for generating the local-sync signal SX on the sync terminal Y # and also for generating the clock signal CLK.

Figure 8:
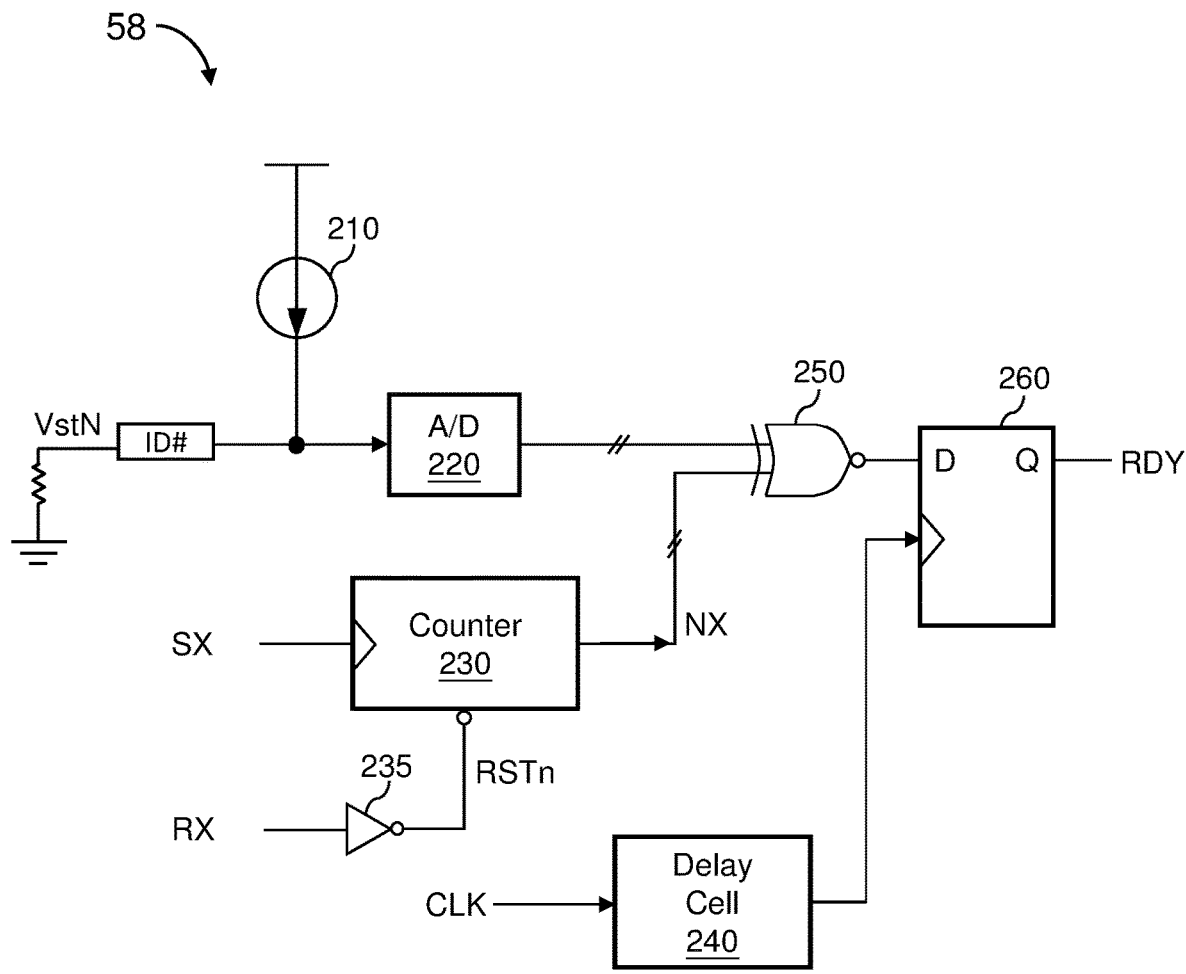
FIG. 8 shows a schematic diagram of a phase enabling circuit which is configured to operably generate the ready signal in accordance with a preferred embodiment of the present invention.

FIG. 8 shows a schematic diagram of a phase enabling circuit 58 which is configured to operably generate the ready signal RDY in accordance with a preferred embodiment of the present invention. In one embodiment, a constant current source 210 outputs a constant current (such as 50 uA) to the identification terminal ID #. This constant current and the resistor (e.g. 10 k~80 k ohm) connected to the identification terminal ID # generates a voltage VstN (e.g. 0.5V~4V) for setting the phase-sequence number ID_N. An analog-to-digital converter 220 is connected to the identification terminal ID # for converting the voltage VstN to generating the phase-sequence number ID_N (e.g. 0~7, as in the embodiment in FIG. 5). A counter 230 generates the count number NX in response to, for example the rising edge of, the local-sync signal SX. The counter 230 is reset by a local-reset signal RX. The local-reset signal RX is generated in response to the reset signal RST. In one embodiment, an inverter is further configured to generate an inverted local-reset signal RSTn to reset the counter 230. The count number NX and the phase-sequence number ID_N are compared by a digital comparator 250 (e.g. an XNOR gate) for determining whether the count number NX reaches the phase-sequence number ID_N. A flip-flop 260 is configured to generate the ready signal RDY when the count number NX reaches the phase-sequence number ID_N according to the comparison result of the digital comparator 250. The state of the flip-flop 260 is triggered and latched by the clock signal CLK. In one embodiment, the clock signal CLK is delayed by a delay cell 240 to trigger the flip-flop 260. From a perspective, the ready signal RDY enables the corresponding power stage circuit to generate the output power.

Figure 9:
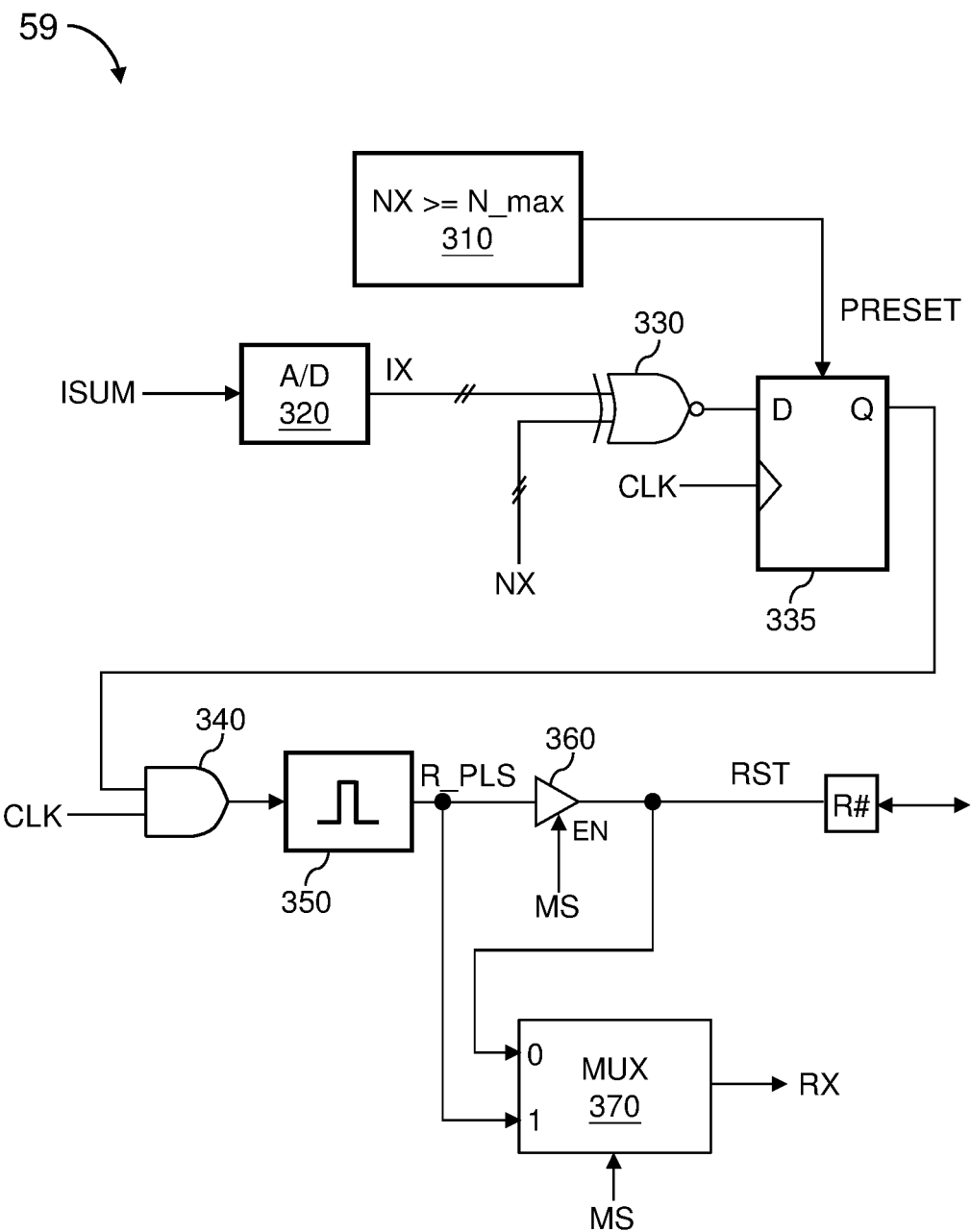
FIG. 9 shows a schematic diagram of a reset circuit for generating the reset signal RST in accordance with a preferred embodiment of the present invention.

FIG. 9 shows a schematic diagram of a reset circuit 59 for generating the reset signal RST in accordance with a preferred embodiment of the present invention. An analog-to-digital converter 320 is configured to convert the load current ISUM to the activated phase number IX. The count number NX and the activated phase number IX are compared by a digital comparator 330 (e.g. an XNOR gate) for determining whether the count number NX reaches the activated phase number IX. In this embodiment, the output of the digital comparator 330 is connected to a flip-flop 335 for generating the reset signal RST once the count number NX reaches the activated phase number IX.

Still referring to FIG. 9, a comparison circuit 310 further sets the flip-flop 335 to generate the reset signal RST when the count number NX reaches a maximum phase number (i.e. N_max) of the count number NX. For example, in a 4-phase power converter, the maximum phase number is 4 and the activated phase number IX can be 4, 3, 2 or 1. in a 8-phase power converter, the maximum phase number is 8 and the activated phase number IX can be any one integer from 1 to 8.

The output of the flip-flop 335 is synchronized with the clock signal CLK to trigger a one-shot pulse generator 350 to generate a master reset-generation signal R_PLS. The master signal MS is configured to enable a buffer 360 to output the reset signal RST according to the master reset-generation signal R_PLS. The reset signal RST and the master reset-generation signal R_PLS are selected by a multiplexer 370 for generating the local-reset signal RX in accordance with the control of the master signal MS. When the conversion control circuit is configured as a slave circuit, the multiplexer 370 selects the reset signal RST received through the reset terminal R # for generating the local-reset signal RX. On the other hand, when the conversion control circuit is configured as the master circuit, the multiplexer 370 selects the master reset-generation signal R_PLS for generating the local-reset signal RX on the reset terminal R.

Figure 10:
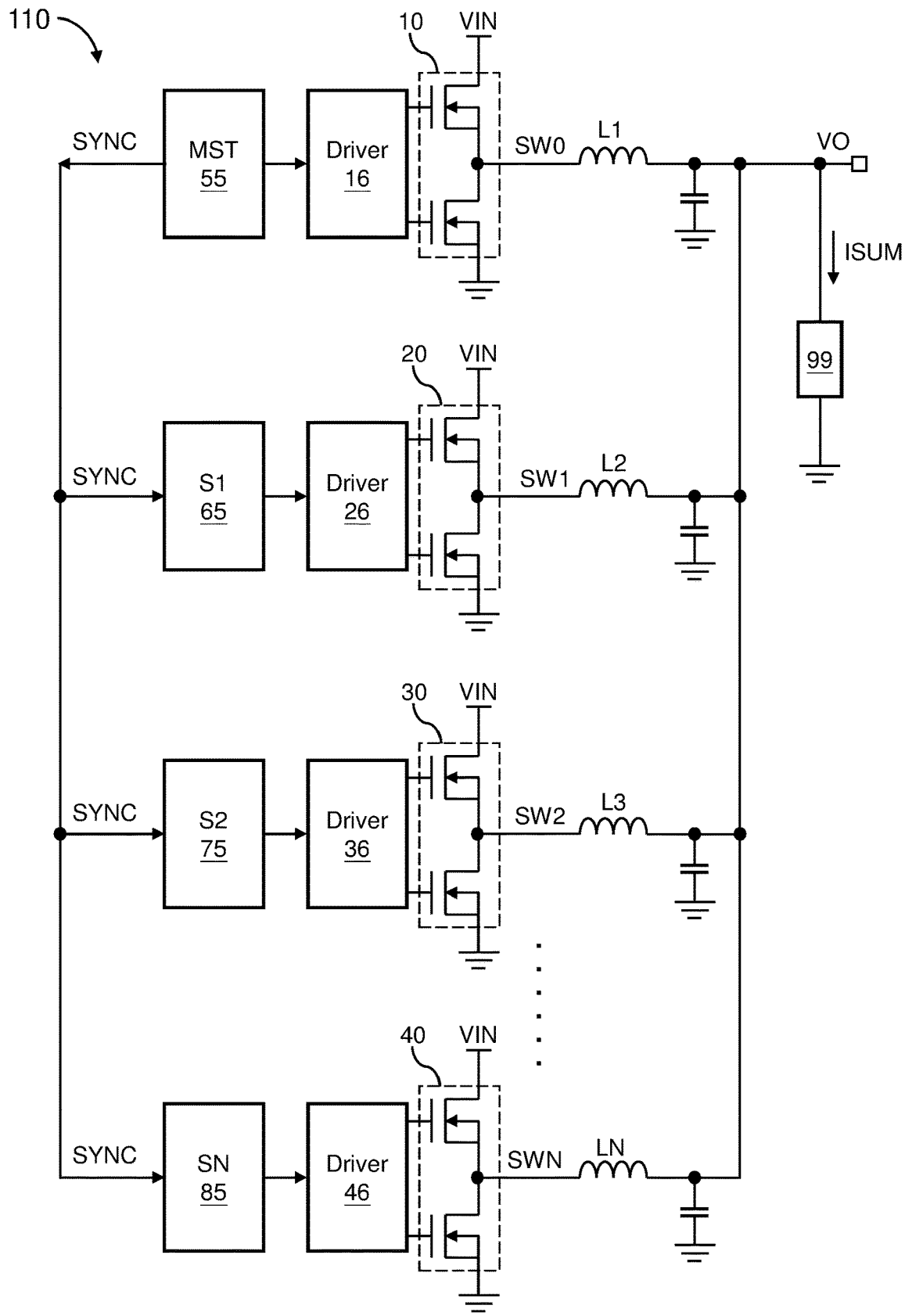
FIG. 10 shows a schematic diagram of the stackable multiphase power converter in accordance with another preferred embodiment of the present invention.

FIG. 10 shows a schematic diagram of the stackable multiphase power converter in accordance with another preferred embodiment of the present invention. The stackable multiphase power converter 110 in FIG. 10 is similar to stackable multiphase power converter 102B in FIG. 2B and differs in that the conversion control circuits (e.g. 55, 65, 75, 85) of the stackable multiphase power converter 110 do not include a dedicated reset terminal. In this embodiment, the local-reset signal RX is alternatively generated in accordance with the synchronization signal SYNC. The local-reset signal RX is configured to reset and initiate the count number NX in every multiphase cycle, which achieves the same operations provided by the reset signal RST and the corresponding local-reset signal RX of the aforementioned embodiments (e.g. FIG. 3, FIG. 8).

Figure 11:
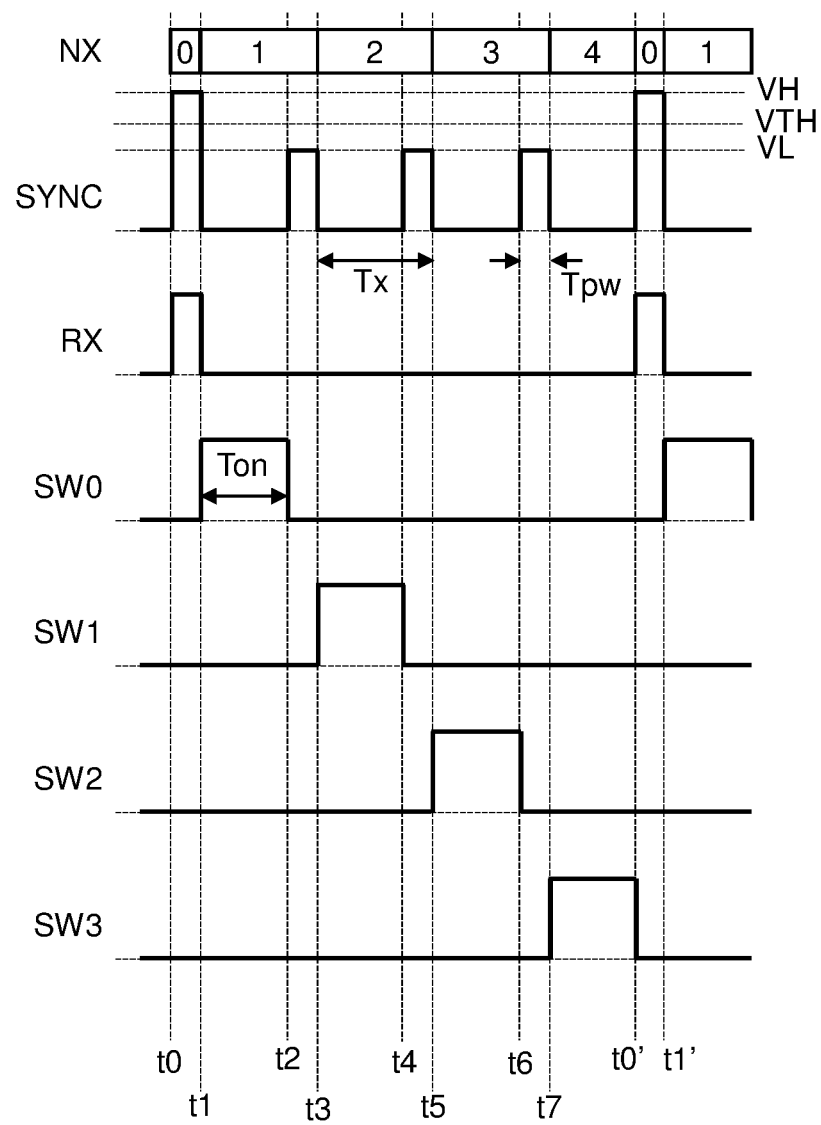
FIG. 11 shows a 4-phases switching waveforms of the conversion control circuit shown in FIG. 10 according to the preferred embodiment of the present invention.

FIG. 11 shows a 4-phases switching waveforms of the conversion control circuit shown in FIG. 10 according to the preferred embodiment of the present invention. In this embodiment, the synchronization signal SYNC includes a plurality of pulses to successively generate a count number NX in the conversion control circuits. The conversion control circuit enables the corresponding stackable power stage circuit to generate the output power to the load 99 when the count number NX is correlated to the phase-sequence number ID_N (i.e. the ready signal RDY is enabled). In this embodiment, the local-reset signal RX (can also be referred to as the reset signal in this embodiment) is configured to reset and initiate the count number NX. As shown in FIG. 11, in this embodiment, a high voltage-level pulse (such as VH) of the synchronization signal SYNC represents the reset signal. Other pulses of the synchronization signal SYNC can be at low voltage-level (such as VL). From one perspective, the reset signal in this embodiment is modulated, or mixed in the pulses of the synchronization signal SYNC. The local-reset signal RX is generated when the voltage level of the synchronization signal SYNC is higher than a threshold VTH.

Figure 12:
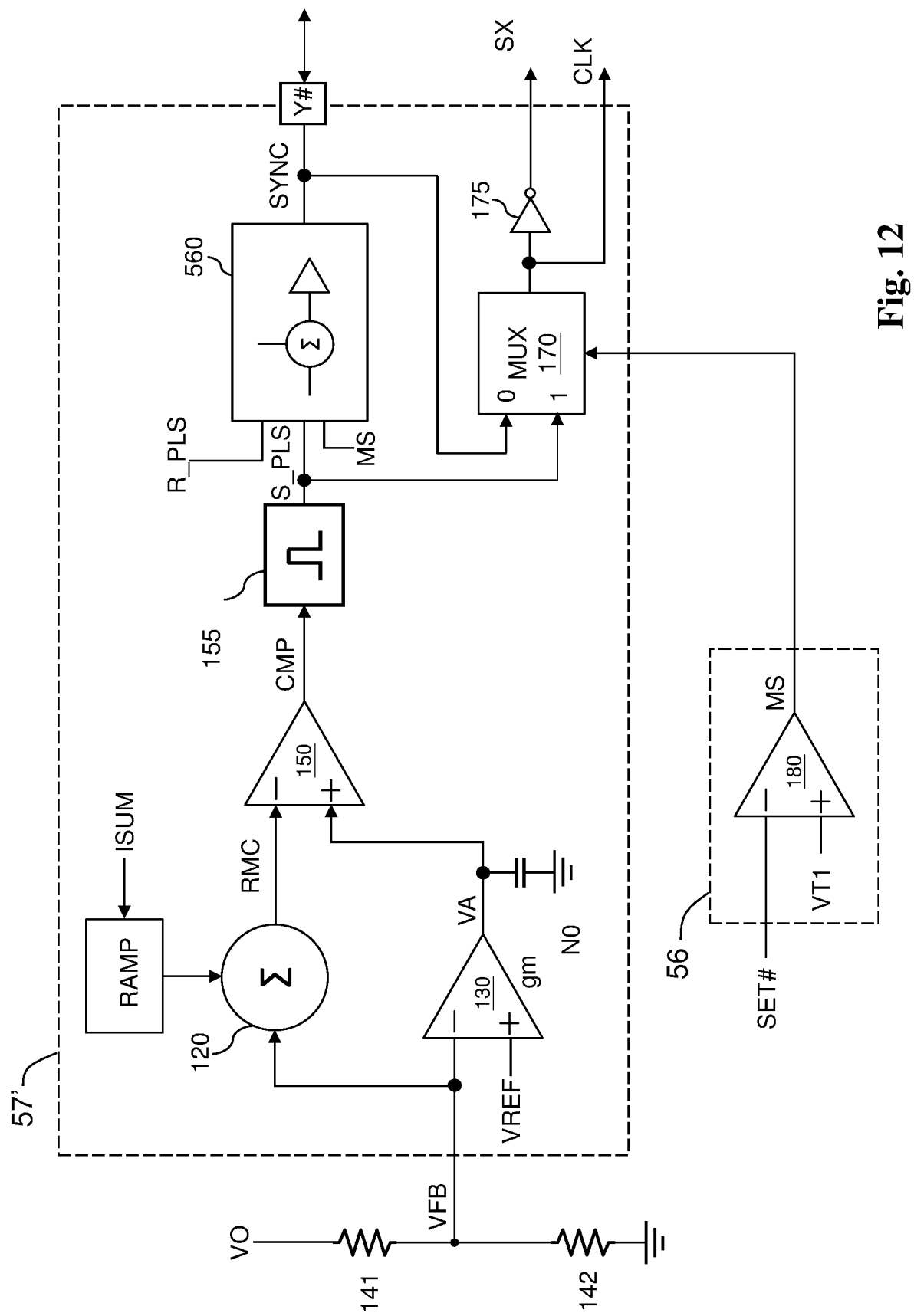
FIG. 12 shows a schematic diagram of a sync circuit for generating the synchronization signal mixed with the reset signal according to a preferred embodiment of the present invention corresponding to FIG. 10 and FIG. 11.

FIG. 12 shows a schematic diagram of a sync circuit 57' for generating the synchronization signal SYNC mixed with the reset signal according to a preferred embodiment of the present invention corresponding to FIG. 10 and FIG. 11. The operation of the sync circuit 57' is similar to the operation of the sync circuit 57 shown in FIG. 7. In this embodiment, the sync circuit 57' further includes a pulse-mixer 560 which is configured to generate the synchronization signal SYNC by summing the sync-generation signal S_PLS with the master reset-generation signal R_PLS, such that the reset signal in this embodiment is modulated, or mixed in the pulses of the synchronization signal SYNC.

Figure 13:
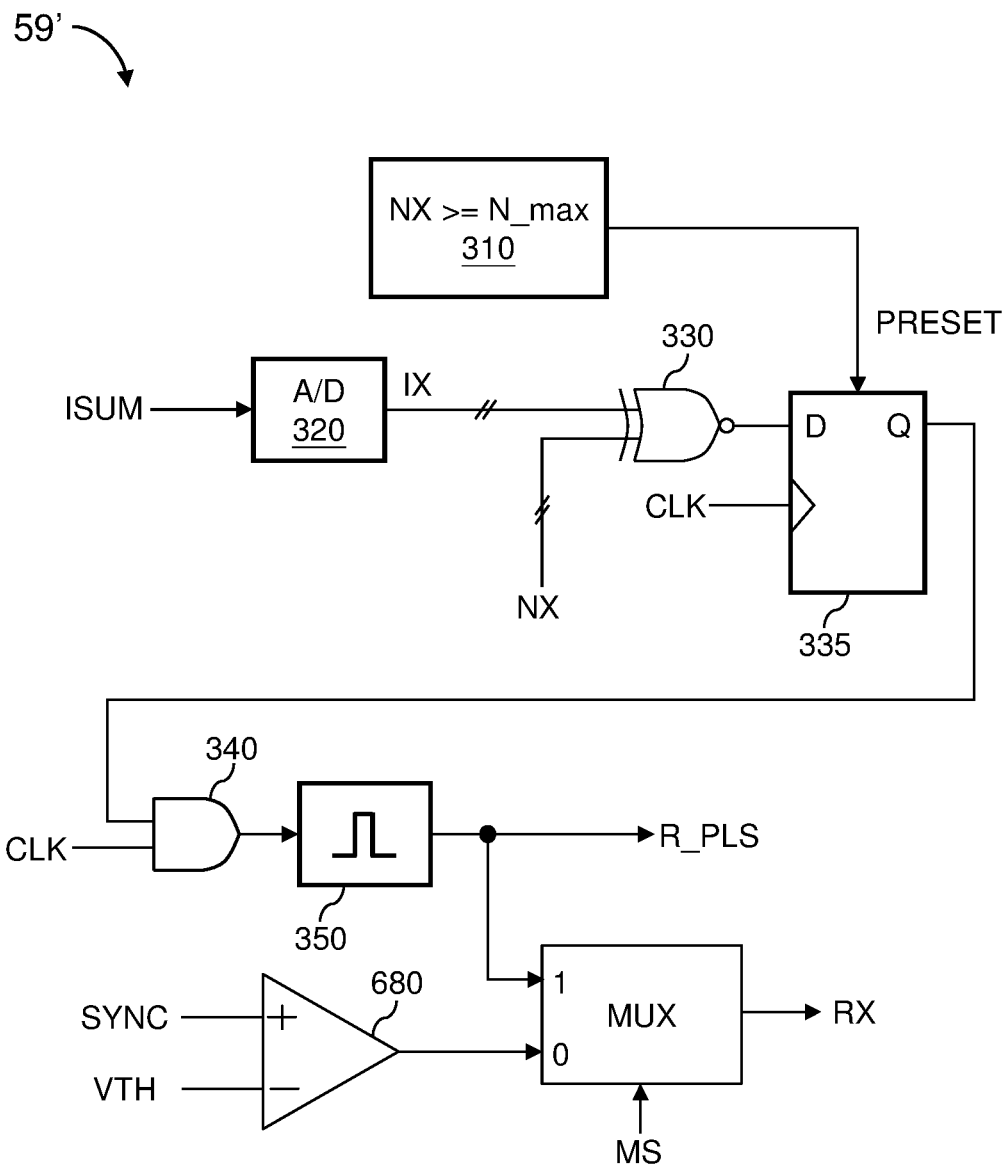
FIG. 13 shows a schematic diagram of a reset circuit 59' for generating the local-reset signal in accordance with a preferred embodiment of the present invention corresponding to FIG. 10, FIG. 11 and FIG. 12.

FIG. 13 shows a schematic diagram of a reset circuit 59' for generating the local-reset signal RX in accordance with a preferred embodiment of the present invention corresponding to FIG. 10, FIG. 11 and FIG. 12. The operation of the reset circuit 59' is similar to the operation of the reset circuit 59 shown in FIG. 9. In this embodiment, the reset circuit 59' further includes a comparator 680 which is configured to receive the synchronization signal SYNC for generating the local-reset signal RX when the conversion control circuit is configured as a slave circuit. The local-reset signal RX is generated when the voltage level of the synchronization signal SYNC is higher than a threshold VTH.

Figure 14:
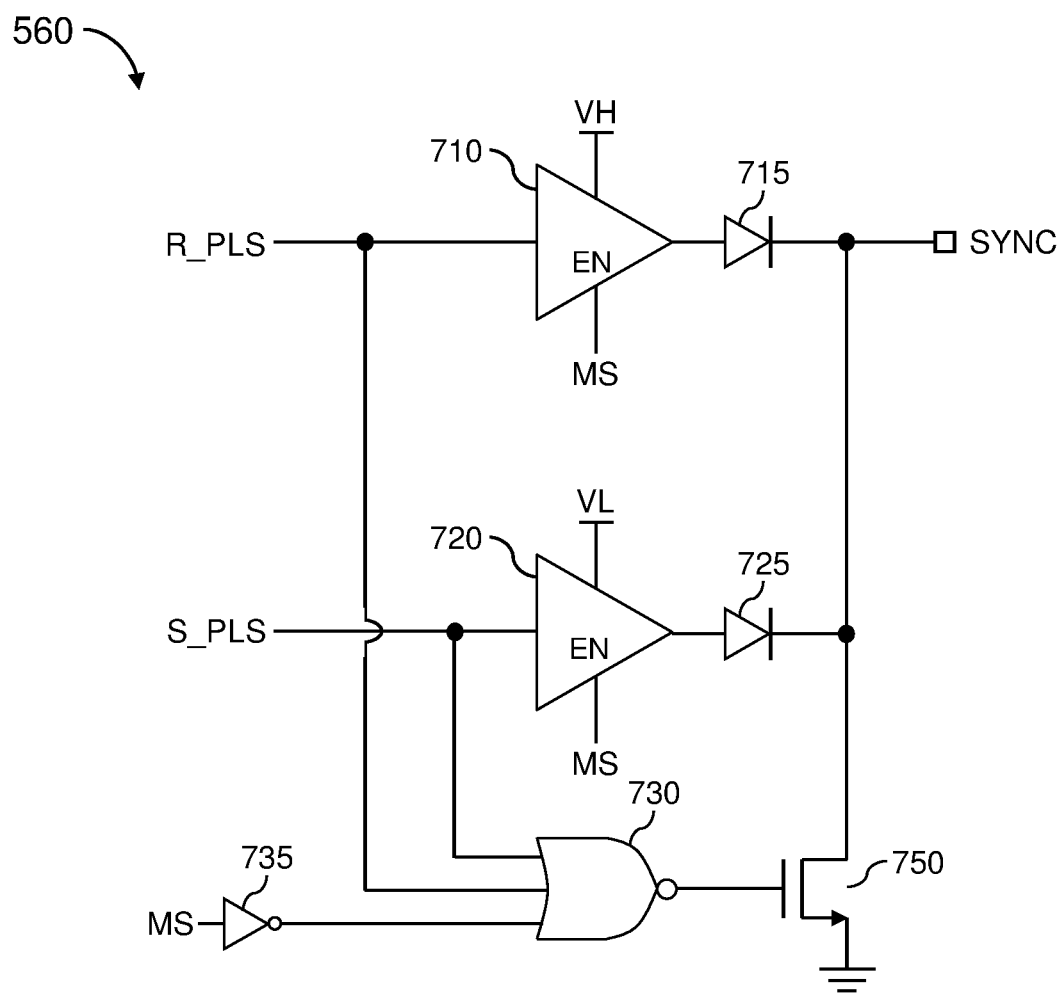
FIG. 14 shows a schematic diagram of the pulse-mixer of the sync circuit in accordance with a preferred embodiment of the present invention corresponding to FIG. 10, FIG. 11 and FIG. 12.

FIG. 14 shows a schematic diagram of the pulse-mixer 560 of the sync circuit 57' in accordance with a preferred embodiment of the present invention corresponding to FIG. 10, FIG. 11 and FIG. 12.

In one embodiment, when the conversion control circuit is configured as the master circuit, the master signal MS enables buffers 710 and 720, and the transistor 750 is turned on to provide a resistive load for biasing the multiplexer formed by the diodes 715 and 725, wherein the on-resistance of the transistor 750 can be configured relatively high to keep high accuracy of the voltage levels of the pulses of the synchronization signal SYNC. The buffer 710 receives the master reset-generation signal R_PLS to generate the high-level pulses of the synchronization signal SYNC. The buffer 720 receives the sync-generation signal S_PLS to generate the low voltage-level pulses of the synchronization signal SYNC. The diodes 715 and 725 are configured as a multiplexer which automatically selects a buffer output, of the buffers 710 and 720, having a higher voltage to generate the synchronization signal SYNC. In one embodiment, the power source (VH) of the buffer 710 is higher than the power source (VL) of the buffer 720.

On the other hand, when the conversion control circuit is configured as a slave circuit, the master signal MS disables the buffers 710 and 720, and transistor 750 is turned off, such that the terminal for generating the synchronization signal SYNC of the pulse-mixer 560 is at a high impedance state.

Figure 15:
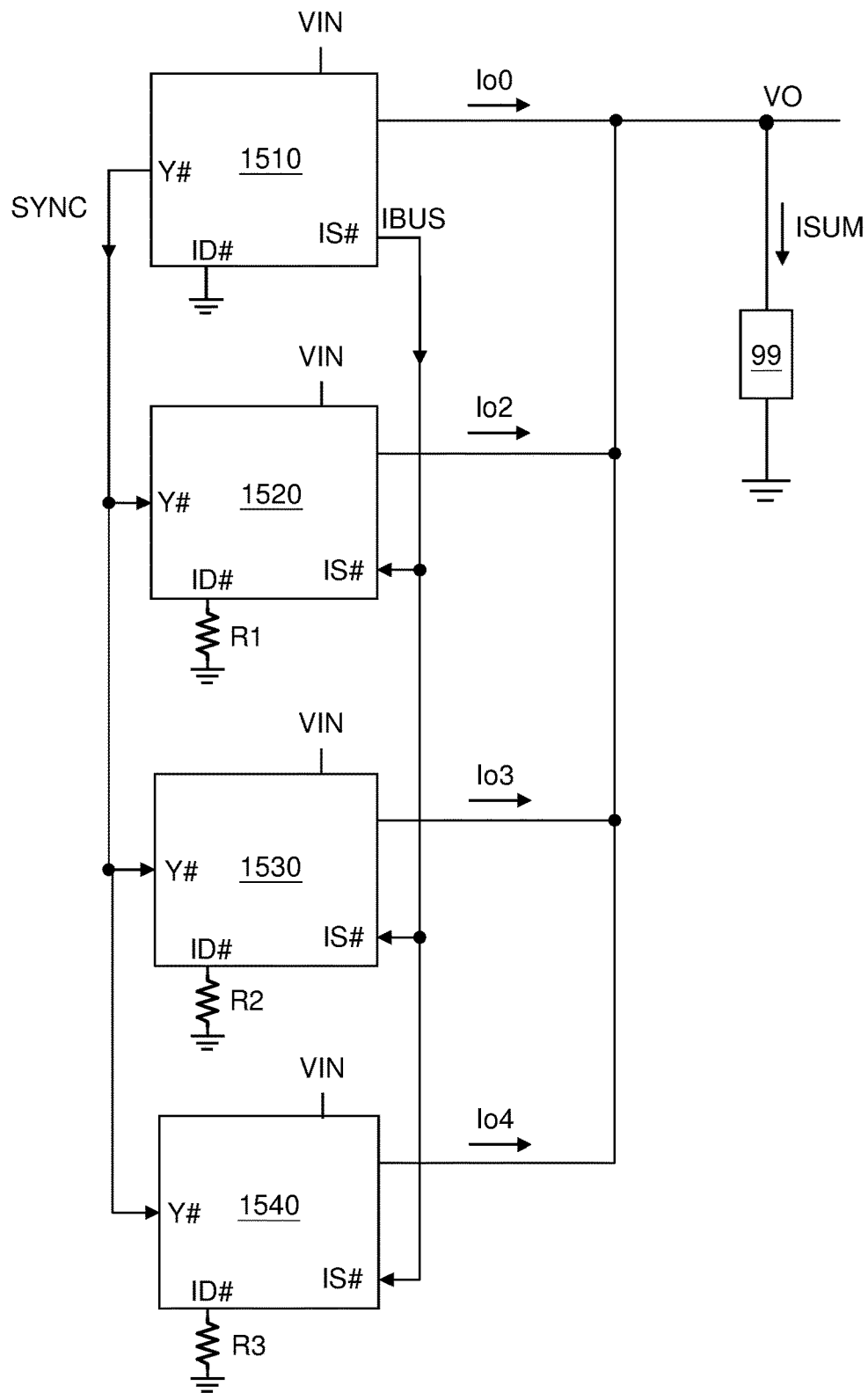
FIG. 15 shows a block diagram of a preferred embodiment of the stackable multiphase power converter according to the present invention.

FIG. 15 shows a block diagram of a preferred embodiment of the stackable multiphase power converter (1015) according to the present invention. The stackable multiphase power converters 1015 is similar to the embodiment shown in FIG. 10 and FIG. 2A.

As shown in FIG. 15, the stackable multiphase power converter 1015 includes sub-converters 1510, 1520, 1530 and 1540. In this embodiment, each of the sub-converters further includes a current sharing terminal IS which is configured for transmitting and receiving a current sharing signal IBUS through.

In one embodiment, all the current sharing terminals (i.e. IS # of the sub-converters 1510, 1520, 1530 and 1540) are connected together, or are connected in parallel in another perspective. In one embodiment, the master sub-converter (e.g. the stackable sub-converter 1510) generates and transmits the current sharing signal IBUS through the corresponding current sharing terminal IS #. On the other hand, the slave stackable sub-converter (e.g. the stackable sub-converter 1520, 1530 or 1540) is configured to receive the current sharing signal IBUS through the respective corresponding current sharing terminal IS #.

The master stackable sub-converter and slave stackable sub-converters are connected to the output voltage VO to regulate the output voltage VO through individual feedback loop, that includes a reference voltage VREF and an error amplifier, of each of the stackable sub-converters. The reference voltage VREF and the error amplifier are utilized to regulate the output voltage VO.

In this embodiment, the master stackable sub-converter outputs the current sharing signal IBUS in accordance with the level of the master stackable sub-converter's output current (Io1). Each of the slave stackable sub-converter inputs and compares the current sharing signal IBUS with its output current (i.e. Io2, Io3, or Io4) to adjust the reference voltage VREF of the voltage feedback loop of the corresponding slave stackable sub-converter for achieving the current sharing.

In one embodiment, the conversion control circuit is configured as an integrated circuit and the synchronization terminal Y # corresponds to a synchronization pin of the integrated circuit and the current sharing terminal IS # corresponds to a current sharing pin of the integrated circuit.

Figure 16:
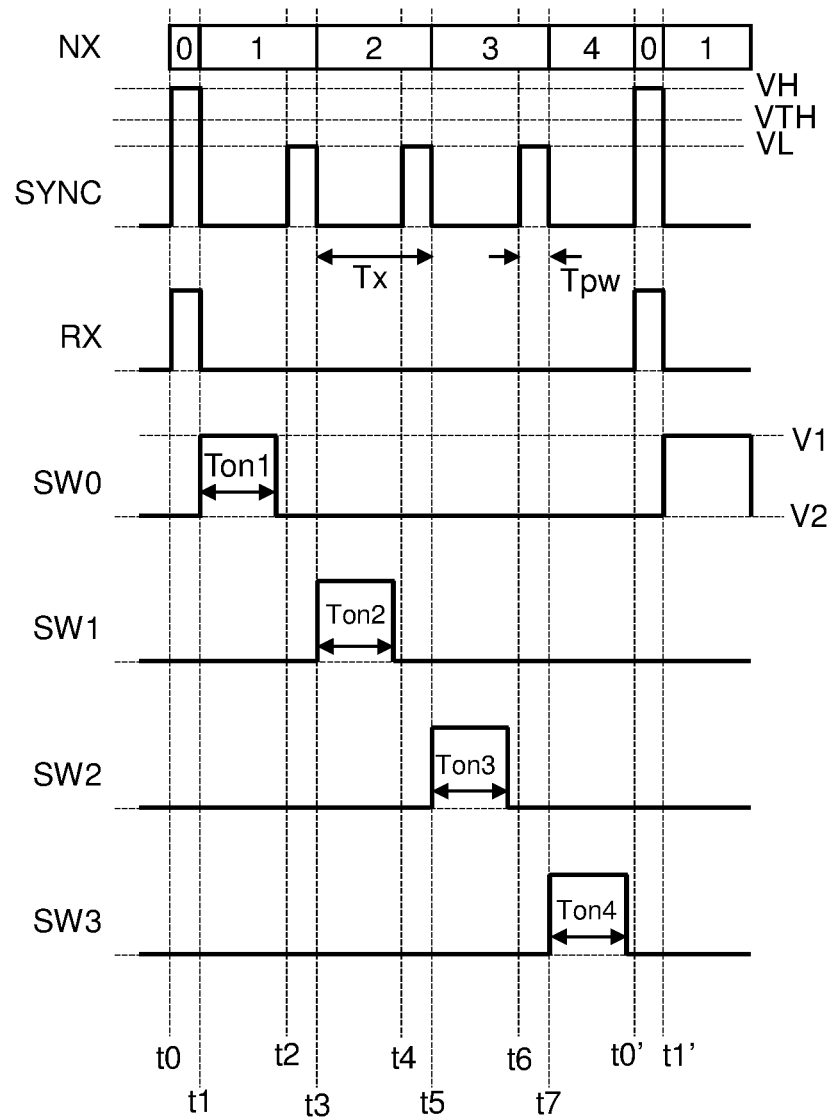
FIG. 16 shows 4-phase switching waveforms corresponding to the preferred embodiment of FIG. 15 according to the present invention.

FIG. 16 shows 4-phase switching waveforms corresponding to the preferred embodiment of FIG. 15 according to the present invention. The stackable sub-converters 1510, 1520, 1530 and 1540 have different PWM pulse-widths, i.e. Ton1, Ton2, Ton3, and Ton4. The pulse-widths of the PWM signals (corresponding to the signals on the switching nodes SW0, SW1, SW2 and SW3 as shown in FIG. 16) of the stackable sub-converters 1510, 1520, 1530 and 1540 can be adjusted independently. In this embodiment, the PWM signal of each stackable sub-converter can be a fixed switching frequency during the heavy load and middle load conditions (i.e. during non-DCM operation).

Referring to FIG. 15 and FIG. 11, in this embodiment, the master reset-generation signal R_PLS is generated when the count number NX reaches an activated phase number IX. The activated phase number IX is increased in response to the increase of the load current ISUM of the load 99. Since the current sharing signal IBUS is proportional to the load current ISUM when current balance is achieved, the stackable sub-converter can determine the activated phase number IX according to the level of the current sharing signal IBUS.

Figure 17:
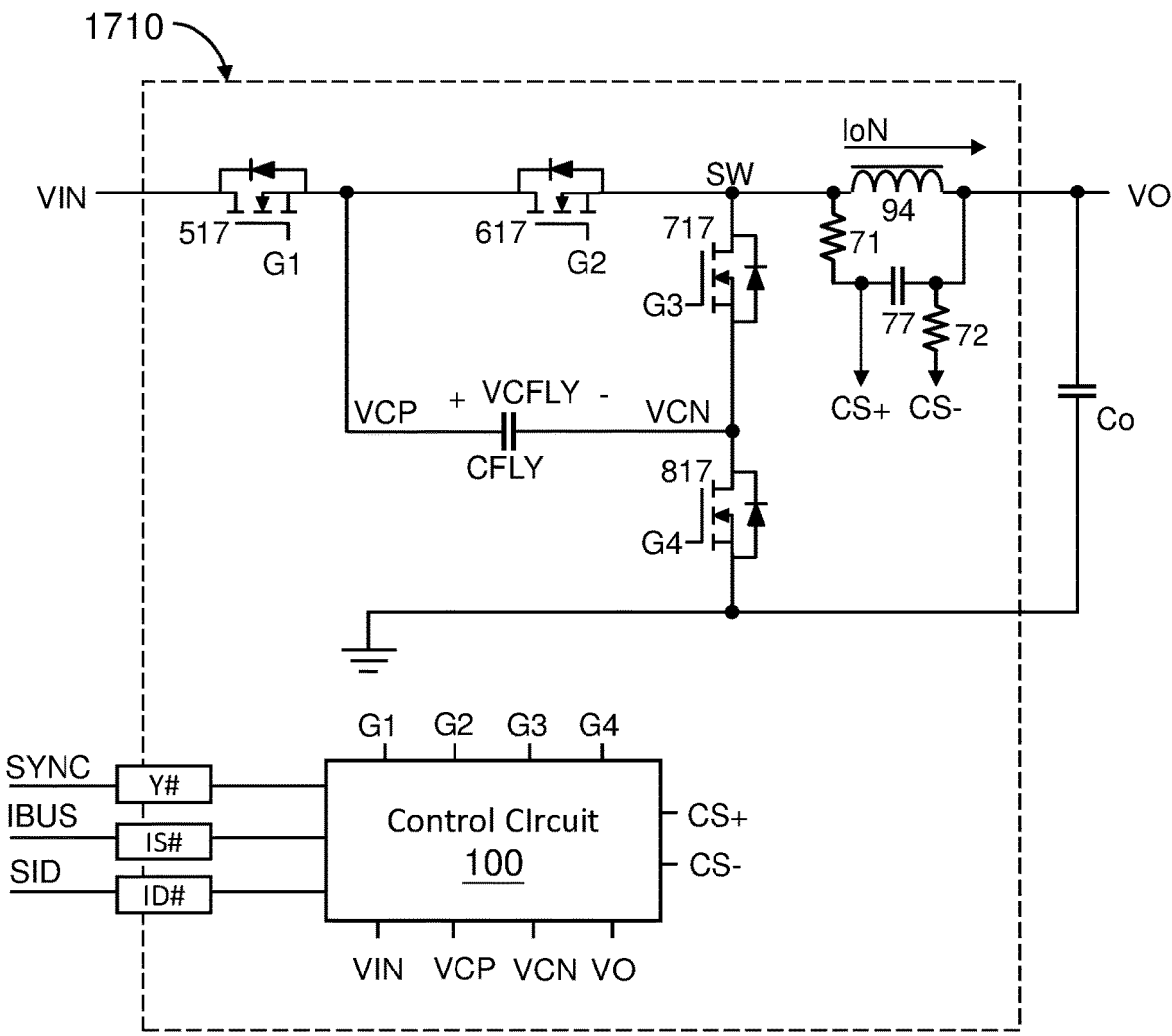
FIG. 17 shows a schematic diagram of a preferred embodiment of a sub-converter of the stackable multiphase power converter according to the present invention.

FIG. 17 shows a schematic diagram of a preferred embodiment of a sub-converter (1710) of the stackable multiphase power converter according to the present invention. The sub-converter 1710 can be a multi-level buck converter, such as a three-level buck converter. The sub-converter 1710 includes a conversion control circuit 100 which is coupled to the synchronization signal SYNC, the current sharing signal IBUS and the identification signal SID through the synchronization terminal Y #, the current sharing terminal IS and the identification terminal ID # respectively. The conversion control circuit 100 is further coupled to receive the input voltage VIN, the output voltage VO, current-sense signals CS+, CS−, flying capacitor voltages VCP, VCN for generating driving signals G1, G2, G3, G4. The driving signals G1, G2, G3, G4 drive transistors 517, 617, 717, 817 respectively to switch a flying capacitor CFLY and an inductor 94 for generating the output voltage VO from the input voltage VIN. In switching steady state, the voltage of the flying capacitor VCFLY is charged and balanced at the level of "VIN/2". During a first phase period (PWM1), the driving signals G1, G3 are coupled to turn on the transistors 517, 717. The voltage of "VIN-VCFY-VO" is applied to the inductor 94 to generate the output current IoN and the output voltage VO. During the 2nd phase period (PWM2), the driving signals G2, G4 are coupled to turn on the transistors 617, 817. The voltage of "VCFY-VO" is applied to the inductor 94 to generate the output current IoN and the output voltage VO. The voltage of the flying capacitor CFLY reduces the voltage applied to the inductor 94, which significantly reduces the ripple current and improve the efficiency of the buck converter. An article of "Three Level Buck Converter with Control and Soft Startup" published in "2009 IEEE Energy Conversion Congress and Exposition" shows details of the operation of three-level buck converter. Resistors 71, 72 and a capacitor 77 are connected to the inductor 94 to sense the output current in accordance to the DCR (DC resistance) of the inductor 94. The differential voltage of CS+ and CS− is related to the level of the output current IoN. Note that the output current IoN corresponds to the aforementioned output current Io1, Io2, Io3 or Io4 of the stackable sub-converter, and the switching node SW corresponds to the aforementioned switching node SW0, SW1, SW2 or SW4 of the stackable sub-converter.

Referring to FIG. 16 and FIG. 17, in a three-level buck converter as shown in FIG. 17, the switching node voltage (e.g. SW0) can be switched between V1 and V2. In one embodiment, V1 and V2 can be VIN and VIN/2 respectively, or can be VIN/2 and ground respectively.

Figure 18:
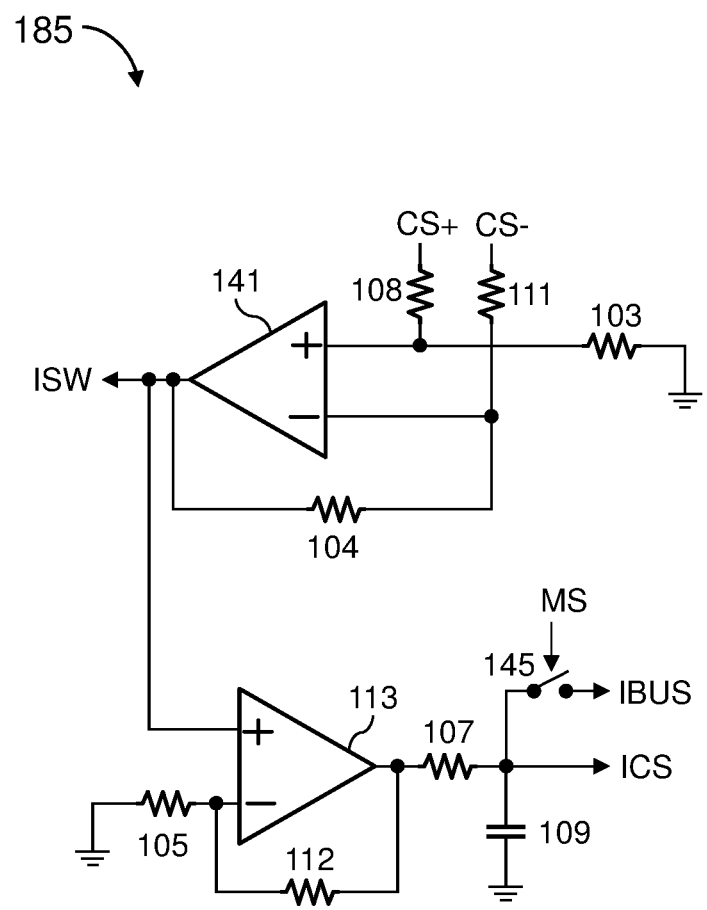
FIG. 18 is a preferred embodiment of a current-sense circuit of the conversion control circuit according to the present invention.

FIG. 18 is a preferred embodiment of a current-sense circuit 185 of the conversion control circuit 100 according to the present invention. The current-sense circuit 185 is configured to generate an output current signal ICS and the current sharing signal IBUS according to the present invention. An operational amplifier 141 and resistors 108, 111, 103, 104 are configured to form a differential amplifier. The current-sense signals CS+, CS− are coupled to the differential amplifier for generating a switching current signal ISW. In one embodiment, the switching current signal ISW is used for the current mode control of the power converter. Note that the current-sense signals CS+, CS− is proportional to the switching current (e.g. IoN) of the corresponding stackable sub-converter. An operational amplifier 113 and resistors 105, 112 are configured to form an amplifier circuit that receives the switching current signal ISW for generating the output current signal ICS through a low-pass filter. A resistor 107 and a capacitor 109 form the low-pass filter. If the conversion control circuit 100 of the stackable sub-converter is operated as a master circuit, the master signal MS turns on the switch 145 to conduct the output current signal ICS to the current sharing terminal IS as the current sharing signal IBUS. In other words, the current sharing signal IBUS is related to the switching current of the master stackable sub-converter.

Figure 19:
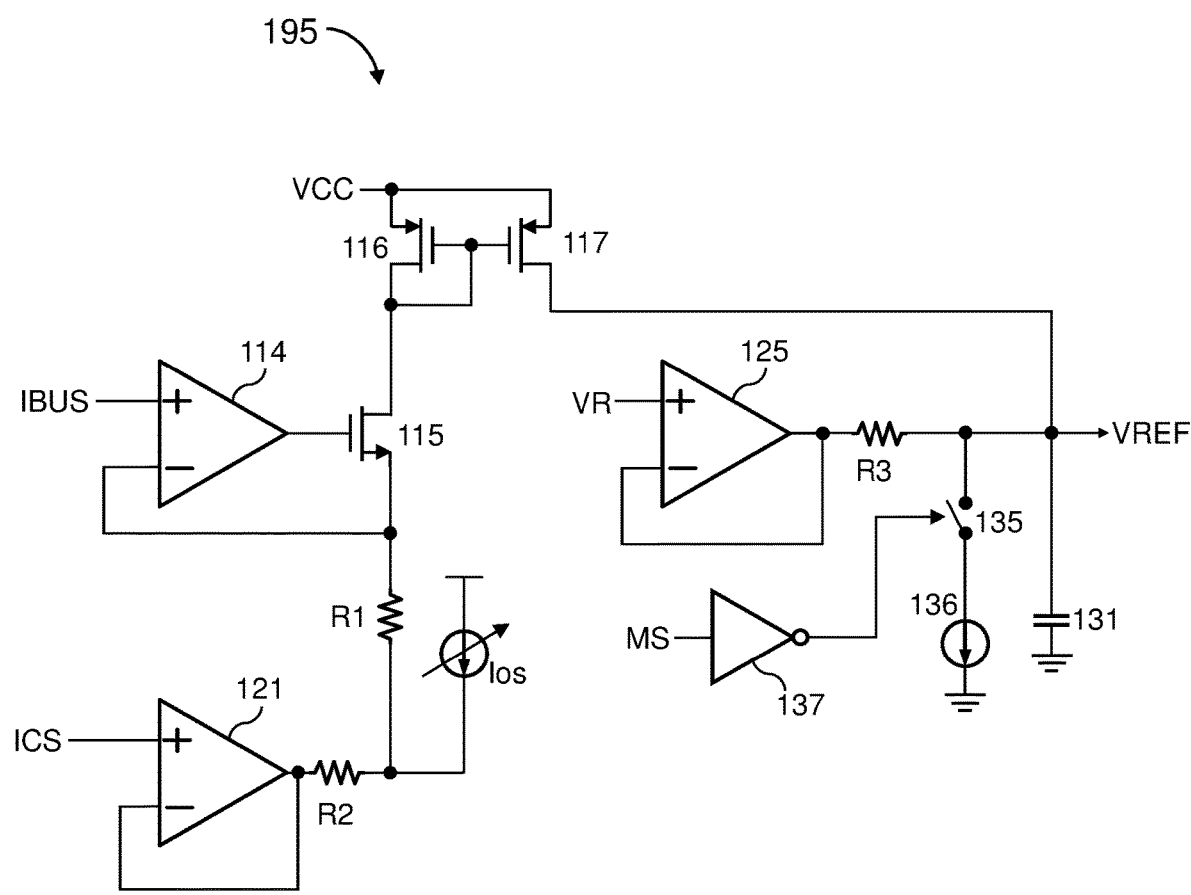
FIG. 19 is a preferred embodiment of a reference adjusting circuit of the conversion control circuit according to the present invention.

FIG. 19 is a preferred embodiment of a reference adjusting circuit 195 of the conversion control circuit 100 according to the present invention. The reference adjusting circuit 195 is configured to generate the adjustable reference voltage VREF for current sharing according to the present invention. A reference voltage VR, a unit-gain buffer 125, a resistor R3 and a current I117 are configured to generate the adjustable reference voltage VREF, which can be expressed as the following equation.

$$VREF = VR + I117 \times R3$$

In this embodiment, the reference voltage VR is a fixed voltage. The current I117 is the source-drain current of a transistor 117 that is mirrored from a current I116 of a transistor 116. The current I116 is generated according to a current I115 of a transistor 115. The current I115 is related to the current sharing signal IBUS, the output current signal ICS and an offset current IOS. More specifically, in this embodiment, the current I115 is related to a voltage difference of the current sharing signal IBUS and the output current signal ICS, which is obtained by the subtractor circuit formed by the amplifiers 114, 121, the transistor 115, the resistor R1 and the resistor R2. The current I115 can be expressed as the following equation.

$$I115 = [(VIBUS - VICS) - (IOS \times R2)]/(R1 + R2)$$

VIBUS is the voltage of the current sharing signal IBUS VICS is the voltage of the output current signal ICS. Note that if (IOS×R2) is higher than (VIBUS−VICS), the current I115 will be equal to zero. Therefore, the offset current IOS provides a minimum current level that allows the slave circuit to join the current sharing. A capacitor 131 provides the loop compensation for the current sharing loop. A switch 135, a constant current source 136 and an inverter 137 are configured to form a preset circuit that provides an initial reference voltage VREF of the slave circuit (e.g. when MS=0). The initial reference voltage VREF of the slave circuit, before the adjustment of the current sharing, is lower than the reference voltage VREF of the master circuit. The initial reference voltage VREF of the slave circuit before the adjustment of the current sharing can be expressed as the following equation.

$$VREF = VR - I136 \times R3 \text{ (i.e. when MS=0 and } I117=0)$$

Consequently, during current sharing operation, the reference voltage VREF of the master circuit is equal to the reference voltage VR. During current sharing operation, the reference voltage VREF of the slave circuit can be further expressed as the following equation.

$$VREF = VR + (I117 - I136) \times R3$$

Figure 20:
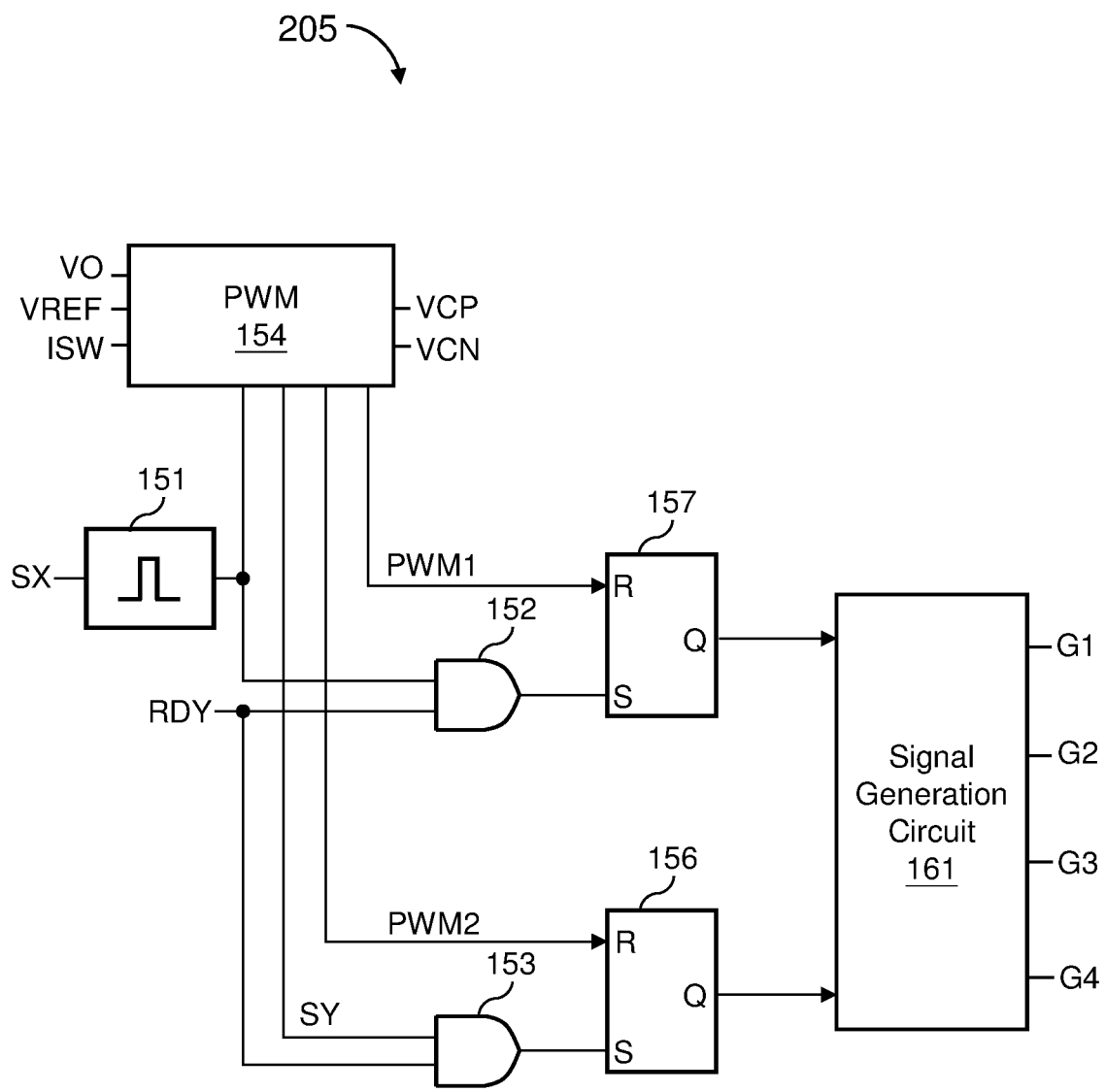
FIG. 20 shows a schematic diagram of a preferred embodiment of a multi-level switching control circuit of the conversion control circuit for generating driving signals G1, G2, G3, G4 according to the present invention.

FIG. 20 shows a schematic diagram of a preferred embodiment of a multi-level switching control circuit 205 of the conversion control circuit 100 for generating driving signals G1, G2, G3, G4 according to the present invention. The stackable sub-converter is triggered on in response to a pulse of a local-sync signal SX (a local synchronization signal). In other words, each of the stackable sub-converter is triggered on in response to a corresponding pulse of the synchronization signal SYNC. The local-sync signal SX is related to the synchronization signal SYNC. A PWM circuit 154 controls the on-time of signals PWM1, PWM2 in accordance with the output voltage VO, the reference voltage VREF, the switching current signal ISW, the input voltage VIN and the flying capacitor voltages VCP and VCN. The on-time of signals PWM1, PWM2 will be increased in response to the increase of the output current of the output voltage VO. The signals PWM1, PWM2 are coupled to generate the driving signals G1, G2, G3, G4 through a signal generation circuit 161. Once a ready signal RDY is enabled, the local-sync signal SX will turn on the pulse width modulation signal PWM1 (the 1st phase period of the multi-level conversion) through a one-shot pulse generator 151. An interleaving local-sync signal SY will turn on the pulse width modulation signal PWM2 (the 2nd phase period of the multi-level conversion) after a 180° phase-shift of the local-sync signal SX. The local-sync signal SX is generated in response to the falling edge of the synchronization signal SYNC. Note that the generation of the ready signal RDY can be referred to the embodiment of FIG. 8.

Figure 21A:
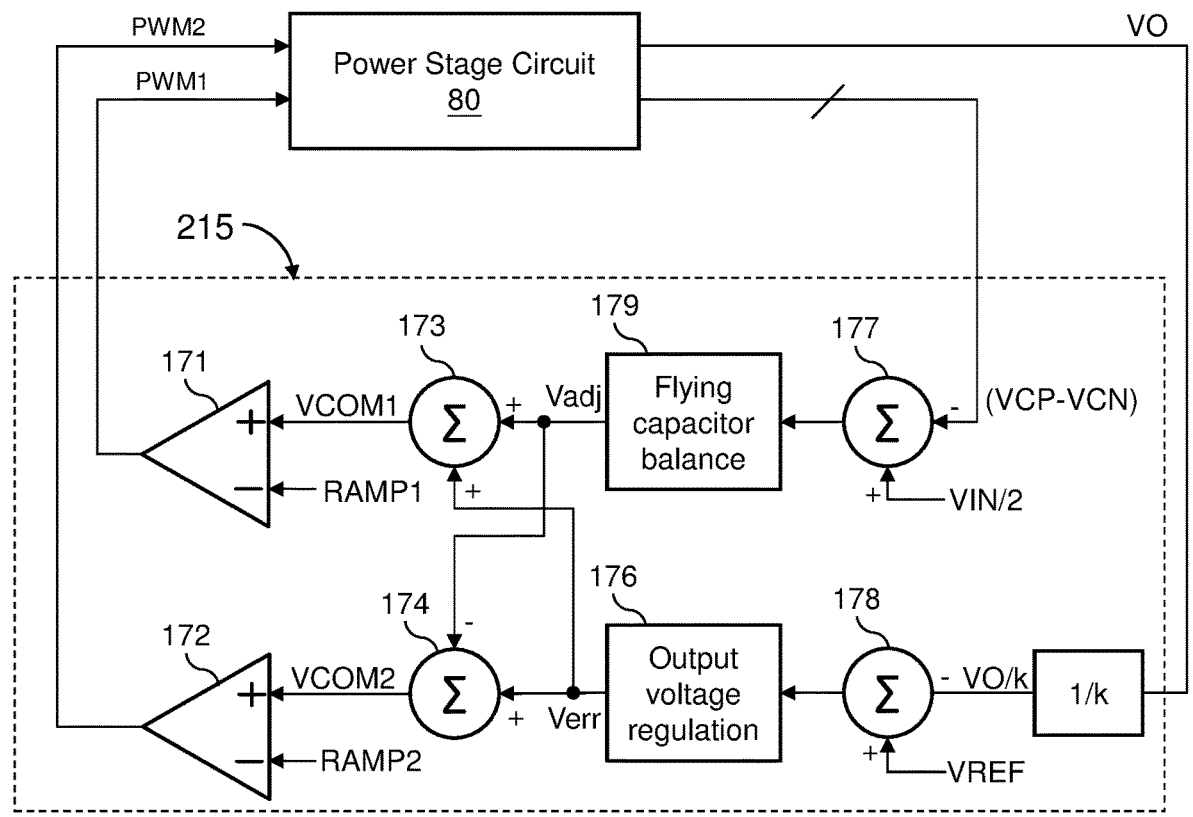
FIG. 21A shows a schematic diagram of a preferred embodiment of the modulation circuit of the conversion control circuit for generating the signals PWM1, PWM2 according to the present invention.

FIG. 21A shows a schematic diagram of a preferred embodiment of the modulation circuit 215 of the conversion control circuit 100 for generating the signals PWM1, PWM2 according to the present invention. An adder 177 is applied to generate a difference between VIN/2 (the half of the input voltage VIN) and the voltage across the flying capacitor (VCP-VCN) for generating an adjust signal Vadj through a flying capacitor balance circuit 179. An adder 178 collaborating with an output voltage regulation circuit 176 operate as an error amplifier to generate an amplified-error signal Verr in accordance with an attenuated output voltage VO/k and the reference voltage VREF. The amplified-error signal Verr and the adjust signal Vadj generate an error signal VCOM1 through an adder 173. An error signal VCOM2 is generated through an adder 174 according to a difference between the amplified-error signal Verr and the adjust signal Vadj. A comparator 171 compares the error signal VCOM1 compares a ramp signal RAMP1 to generate the pulse width modulation signal PWM1. A comparator 172 compares the error signal VCOM2 with a ramp signal RAMP2 to generate the pulse width modulation signal PWM2. The switching current signal ISW and a slope signal SLOPE1 form the ramp signal RAMP1. The switching current signal ISW and a slope signal SLOPE2 form the ramp signal RAMP2. The pulse width modulation signals PWM1, PWM2 are coupled to the power stage circuit 80 of the stackable sub-converter to generate the output voltage VO, wherein VO=k×VREF. The power stage circuit 80 for example includes the signal generation circuit 161 shown in FIG. 20 and the power stage 85 shown in FIG. 17.

Furthermore, the voltage VCFLY across the of the flying capacitor CFLY is adjusted and balanced to VIN/2 (the half of the input voltage VIN) through the loop adjustment of the pulse width modulation signals PWM1, PWM2.

Figure 21B:
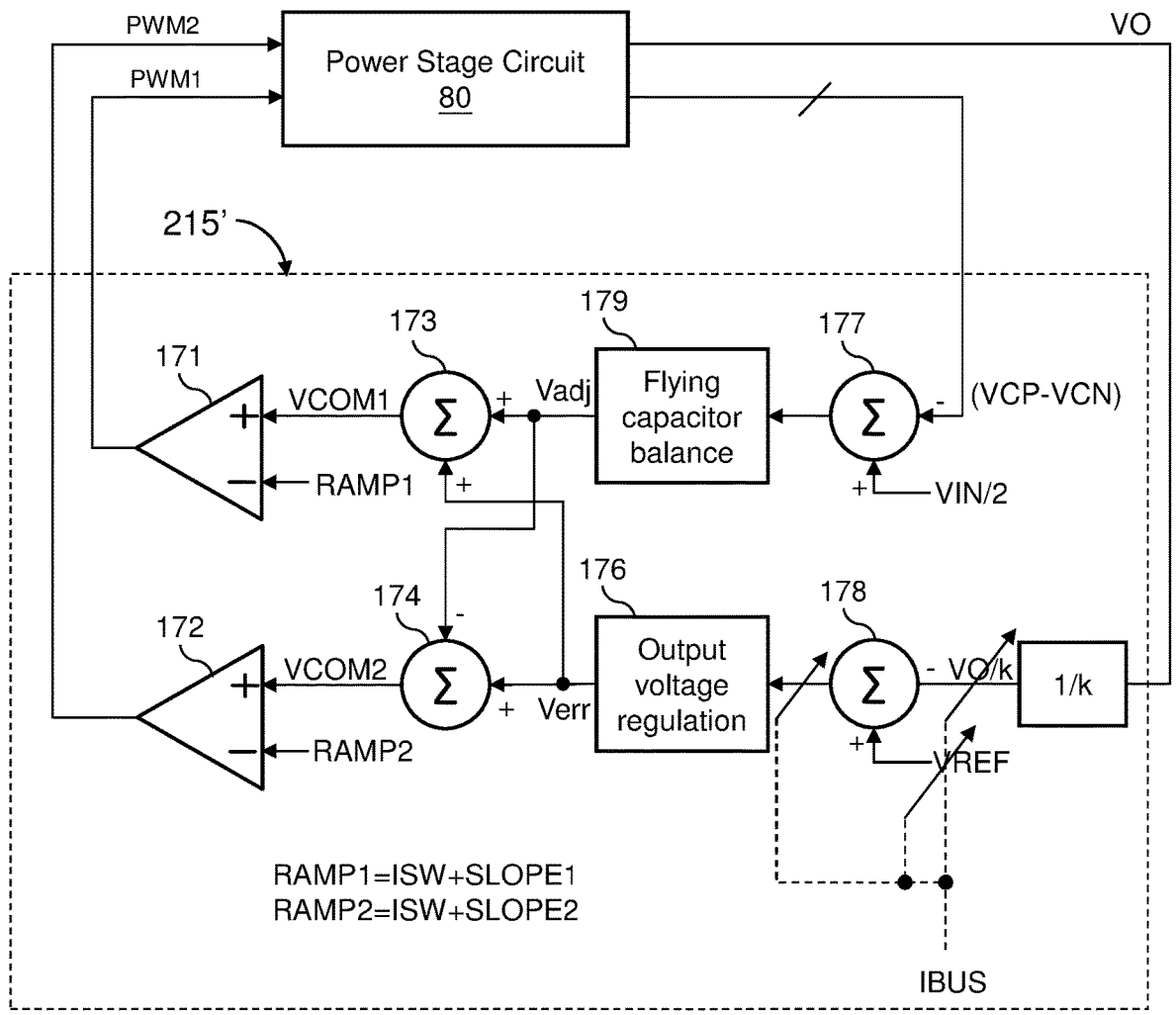
FIG. 21B shows a schematic diagram of a preferred embodiment of the modulation circuit of the conversion control circuit for generating the signals PWM1, PWM2 according to the present invention.

FIG. 21B shows a schematic diagram of a preferred embodiment of the modulation circuit 215 of the conversion control circuit 100 for generating the signals PWM1, PWM2 according to the present invention. FIG. 21B further shows possibilities of adjustment for current sharing. In addition to adjusting the reference voltage VREF of the slave circuit for current sharing, in one embodiment, the current sharing can alternatively achieved by adjusting the offset of the feedback circuit (e.g. injecting an offset current to a 1/k voltage divider) or the input offset of the error amplifier of the slave circuit.

Figure 22:
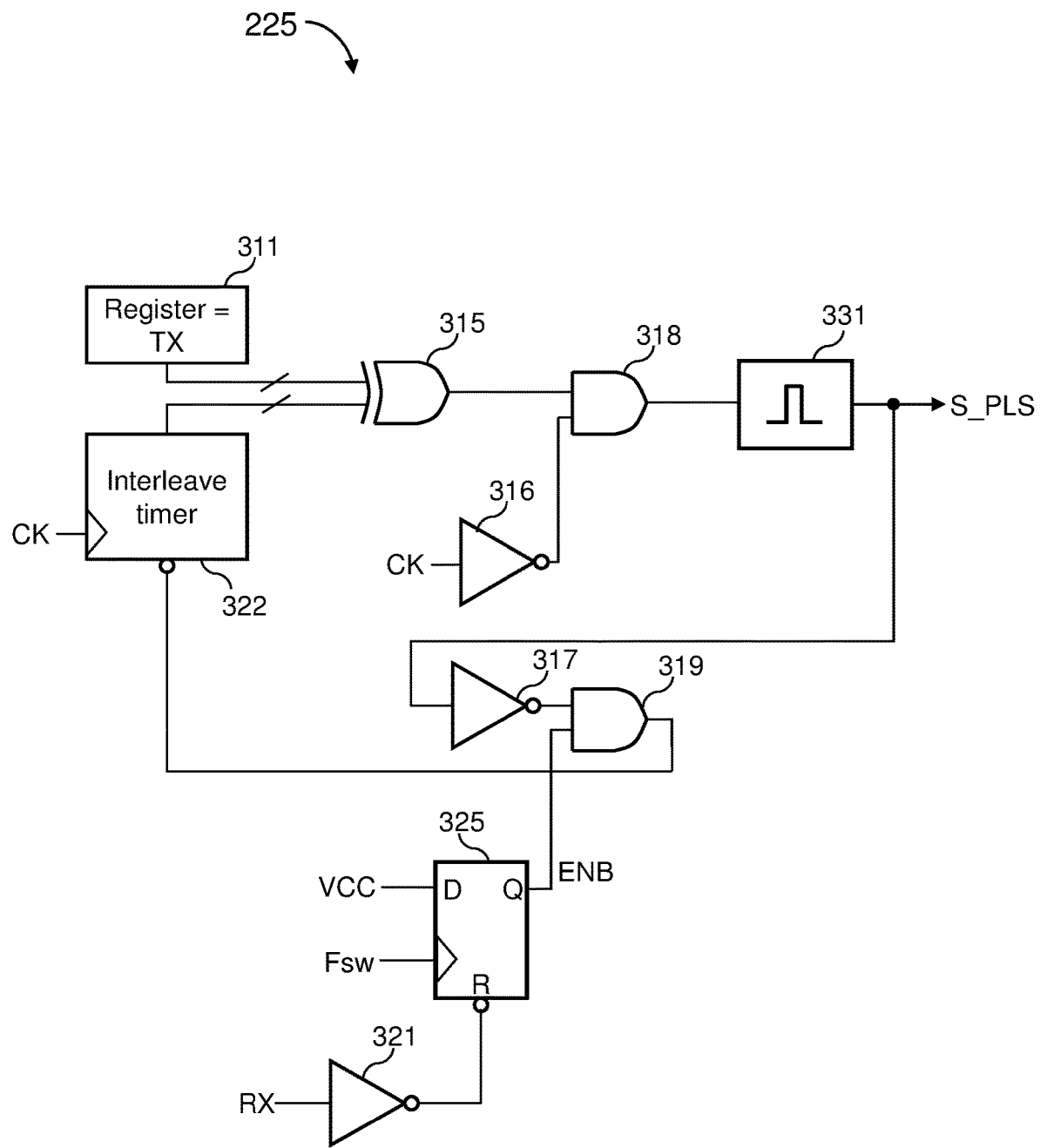
FIG. 22 shows a schematic diagram of a preferred embodiment of the sync-generation circuit of the conversion control circuit for generating a sync-generation signal according to the present invention.

FIG. 22 shows a schematic diagram of a preferred embodiment of the sync-generation circuit 225 of the conversion control circuit 100 for generating a sync-generation signal S_PLS according to the present invention. The sync-generation signal S_PLS is utilized to generate the synchronization signal SYNC if the conversion control circuit of the stackable sub-converter is operated as a master circuit. A register 311 stores a number that represents an interleave period TX (shown in FIG. 16). When the sync-generation signal S_PLS is generated by a pulse generator 331, the sync-generation signal S_PLS will be coupled to clear an interleave timer 322 via an inverter 317 and an AND gate 319. After the pulse period TPW (shown in FIG. 16) of the sync-generation signal S_PLS, the interleave timer 322 will start count by an oscillation signal CK. Once the number of the interleave time is equal to the number stored in the interleave time register 311, a comparator 315 will trigger the pulse generator 331 to generate the next of the sync-generation signal S_PLS. A flip-flop 325 generates a signal ENB connected to the AND gate 319 to limit the maximum switching frequency of the master circuit and slave circuit under a frequency of a signal FSW. The signal FSW is applied to set the flip-flop 325, and the local-reset signal RX is coupled to clear the flip-flip 325. Note that the number stored in the interleave time register 311 is programmable.

Figure 23:
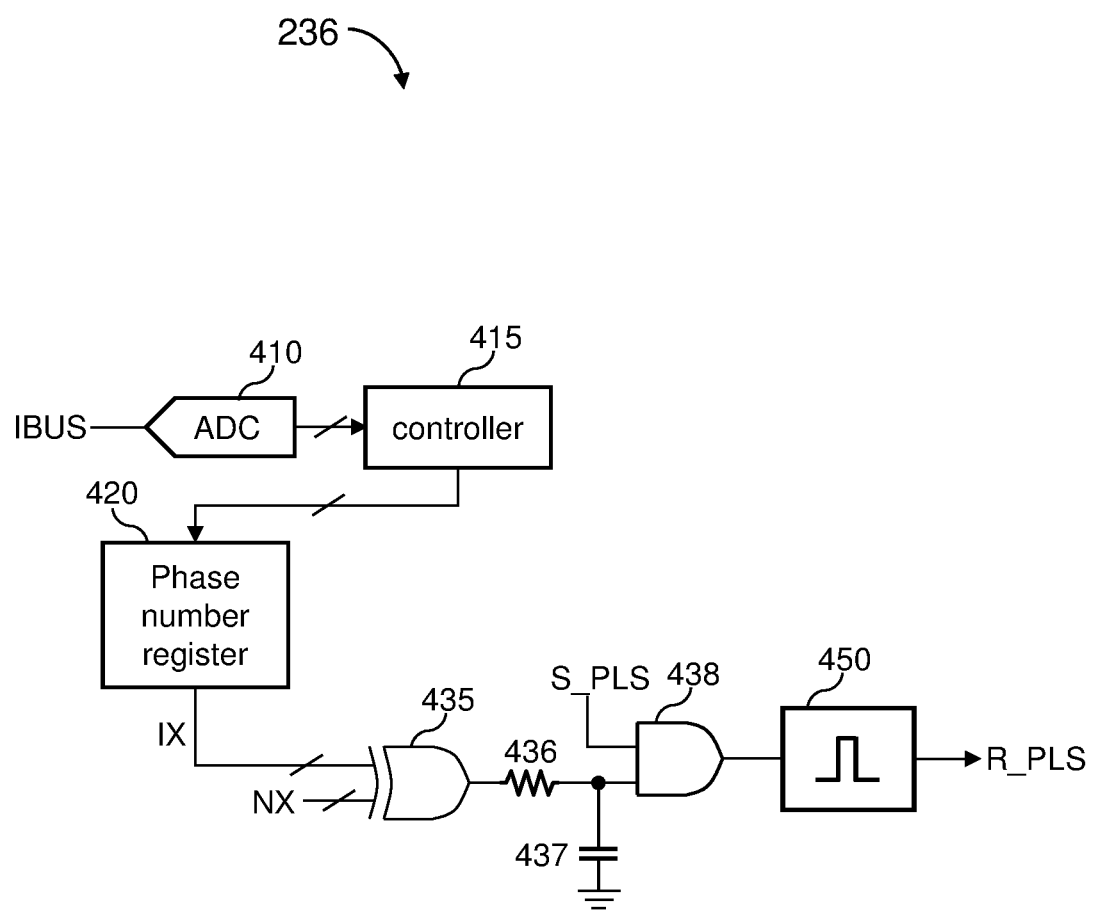
FIG. 23 shows a schematic diagram of a preferred embodiment of the reset-generation circuit of the conversion control circuit for generating the master reset-generation signal in accordance with a preferred embodiment of the present invention.

FIG. 23 shows a schematic diagram of a preferred embodiment of the reset-generation circuit 236 of the conversion control circuit 100 for generating the master reset-generation signal R_PLS in accordance with a preferred embodiment of the present invention. A logic controller 415 is coupled to detect the level of the current sharing signal IBUS (through an analog-to-digital converter 410) and determine the activated phase number IX. The activated phase number IX is stored in a phase number register 420. The output of a comparator 435 is connected to a pulse generator 450 via an AND gate 438 for generating the master reset-generation signal R_PLS once the count number NX reaches the activated phase number IX.

Figure 24:
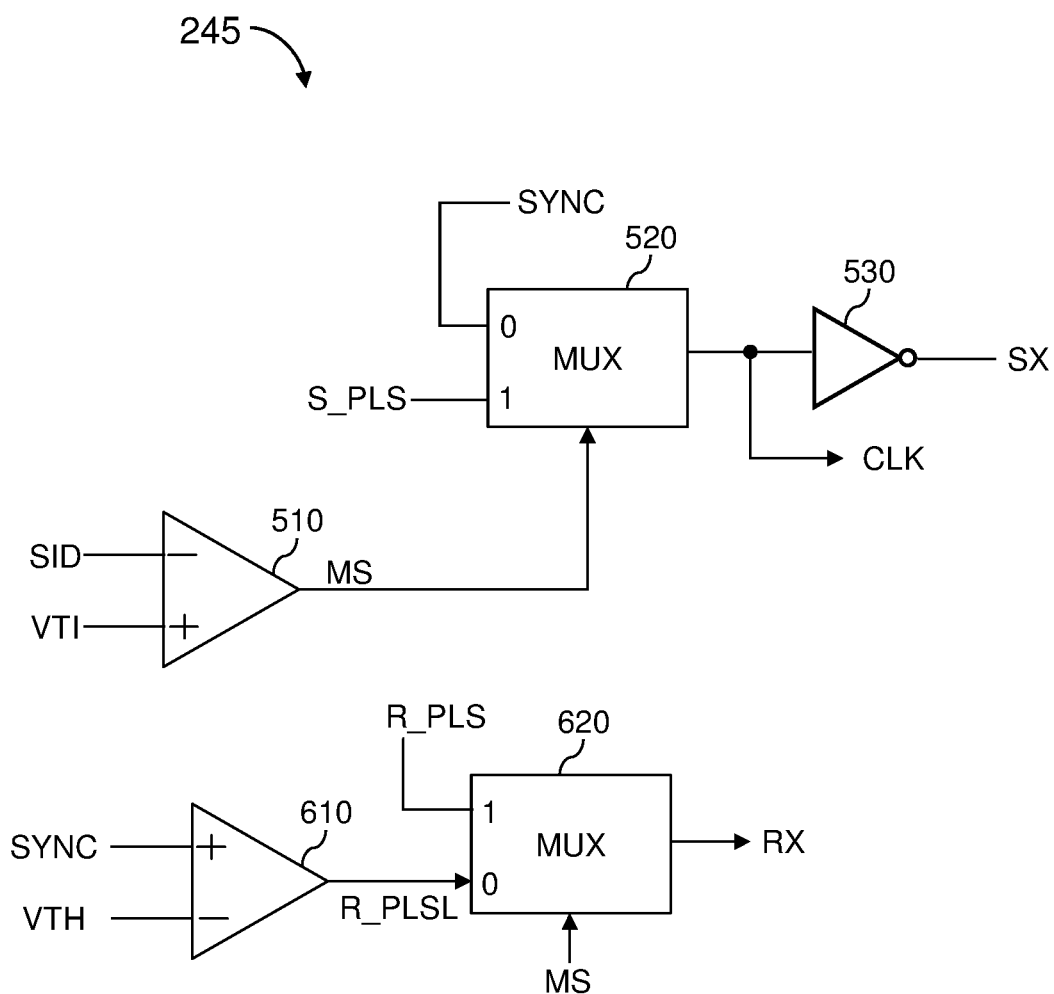
FIG. 24 shows a schematic diagram of a preferred embodiment of the local generation circuit of the conversion control circuit for generating the local-sync signal, the local-reset signal and the master signal according to the present invention.

FIG. 24 shows a schematic diagram of a preferred embodiment of the local generation circuit 245 of the conversion control circuit 100 for generating the local-sync signal SX, the local-reset signal RX and the master signal MS according to the present invention. A comparator 510 is coupled to the identification terminal ID # to generate a master signal MS if the voltage level of the identification signal SID is lower than a threshold VT1. Another comparator 610 is coupled to detect the synchronization signal SYNC to generate a slave reset-generation signal R_PLSL if the voltage level of the synchronization signal SYNC is higher than threshold VTH.

The synchronization signal SYNC and the sync-generation signal S_PLS are connected to a multiplex 520 for generating the local-sync signal SX and a clock signal CLK in accordance with the control of the master signal MS. When the conversion control circuit is operated as slave circuit, the multiplex 520 receives the synchronization signal SYNC for generating the local-sync signal SX and the clock signal CLK. The clock signal CLK is related to the rising edge of the synchronization signal SYNC. The local-sync signal SX is related to the falling edge of the synchronization signal SYNC.

The master reset-generation signal R_PLS and the slave reset-generation signal R_PLSL are connected to a multiplex 620 for generating the local-reset signal RX in accordance with the control of the master signal MS. When the conversion control circuit is operated as slave circuit, the multiplex 620 receives the slave reset-generation signal R_PLSL for generating the local-reset signal RX.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A conversion control circuit for use in controlling a stackable multiphase power converter, wherein the stackable multiphase power converter includes plural stackable sub-converters, wherein each of the plural stackable sub-converters includes a power stage circuit and one corresponding conversion control circuit, wherein the plural power stage circuits of the plural stackable sub-converters are coupled in parallel to generate an output power to a load, wherein the conversion control circuit is configured to control the at least one switch of the power stage circuit for switching an inductor to generate the output power, the conversion control circuit comprising:
   a current sharing terminal, wherein a current sharing signal is configured to be connected to the current sharing terminals, in parallel, of the plurality of the conversion control circuits; and
   a current sharing circuit, configured to generate or receive the current sharing signal which is generated according to an output current of the output power;
   wherein the conversion control circuit adjusts the power stage circuit according to the current sharing signal for current sharing among the plural stackable sub-converters.

2. The conversion control circuit as claimed in claim 1, wherein conversion control circuit is configured as a master circuit or a slave circuit;
   wherein the master circuit is configured to generate the current sharing signal, and the slave circuit is configured to receive the current sharing signal.

3. The conversion control circuit as claimed in claim 1, wherein the stackable sub-converter is a multi-level buck converter.

4. The conversion control circuit as claimed in claim 3, wherein the stackable sub-converter is a three-level buck converter.

5. The conversion control circuit as claimed in claim 2, further comprising a reference voltage for regulating an output voltage of the output power; wherein the reference voltage of the slave circuit is adjusted for current sharing in accordance with the current sharing signal.

6. The conversion control circuit as claimed in claim 5, wherein the reference voltage of the slave circuit is lower than the reference voltage of the master circuit before the reference voltage of the slave circuit is adjusted for current sharing.

7. The conversion control circuit as claimed in claim 2, further comprising a feedback divider, a reference voltage, an error amplifier, a ramp signal and a modulation comparator which are configured to form a feedback loop for regulating an output voltage of the output power;
   wherein an offset of the feedback divider or an input offset of the error amplifier is adjusted for current sharing in accordance with the current sharing signal.

8. The conversion control circuit as claimed in claim 2, wherein the conversion control circuit further comprises:
   a synchronization terminal, wherein a synchronization signal is configured to be connected to the synchronization terminals, in parallel, of the plurality of the conversion control circuits;
   wherein the synchronization signal includes a plurality of pulses to be successively counted as a count number, wherein the synchronization signal includes a reset signal which is configured to reset and initiate the count number;
   wherein the conversion control circuit enables the power stage circuit to generate the output power when the count number is correlated to a phase-sequence number of the conversion control circuit;
   wherein the master circuit is configured to generate the synchronization signal through the synchronization terminal, and the slave circuit is configured to receive the synchronization signal through the synchronization terminal.

9. The conversion control circuit as claimed in claim 2, wherein the conversion control circuit further comprises a current-sense circuit which is configured to generate a current-sense signal according the output current of the sub-converter; wherein the current-sharing signal is equal to the current-sense signal of the master circuit.

10. The conversion control circuit as claimed in claim 8, further comprising an identification terminal for setting the phase-sequence number, wherein the phase-sequence number is determined according to an electrical parameter level on the identification terminal.

11. The conversion control circuit as claimed in claim 10, wherein the conversion control circuit is further determined to operate as a master circuit or a slave circuit according to the phase-sequence number.

12. The conversion control circuit as claimed in claim 10, the conversion control circuit further comprising a constant current source which is coupled to a resistor through the identification terminal, wherein the phase-sequence number is determined according to a voltage level of the identification terminal.

13. The conversion control circuit as claimed in claim 8, wherein a pulse, having a higher voltage level, of the synchronization signal represents the reset signal.

14. The conversion control circuit as claimed in claim 8, wherein the reset signal is generated when the count number reaches an activated phase number, wherein the activated phase number is increased in response to the increase of a load current consumed by the load.

15. The conversion control circuit as claimed in claim 8, wherein the stackable sub-converter is triggered on in response to a corresponding pulse of the synchronization signal.

16. The conversion control circuit as claimed in claim 4, wherein the conversion control circuit of the three-level buck converter generates a pulse width modulation (PWM)

signal to control the power stage circuit for generating the output power, wherein the conversion control circuit adjusts the pulse-width of the PWM signal to balance the voltage of the a flying capacitor of the three-level buck converter to be a half value of an input voltage of the stackable multiphase power converter.

17. The conversion control circuit as claimed in claim 1, wherein the stackable sub-converter is operated in a current mode control.

18. The conversion control circuit as claimed in claim 8, wherein stackable multiphase power converter is operated in a fixed switching frequency during a heavy load condition.

19. The conversion control circuit as claimed in claim 8, wherein the conversion control circuit is configured as an integrated circuit and the synchronization terminal corresponds to a synchronization pin of the integrated circuit and the current sharing terminal corresponds to a current sharing pin of the integrated circuit.

20. A method for controlling a stackable multiphase power converter, wherein the stackable multiphase power converter includes plural stackable sub-converters, wherein each of the plural stackable sub-converters includes a power stage circuit and a conversion control circuit, wherein the plural power stage circuits of the plural stackable sub-converters are coupled in parallel to generate an output power to a load, wherein the power stage circuits includes at least one switch for switching an inductor for generating the output power, wherein one of the plural stackable sub-converters is configured as a master stackable sub-converter and another of plural stackable sub-converters is configured as a slave stackable sub-converter, the method comprising:
   controlling the at least one switch of the power stage circuit for switching the corresponding inductor;
   generating a current sharing signal by the master stackable sub-converter according to an output current of the output power;
   receiving the current sharing signal by the slave stackable sub-converter; and
   adjusting the power stage circuit according to the current sharing signal for current sharing among the plural stackable sub-converters.

21. The method as claimed in claim 20, further comprising:
   generating a reference voltage for regulating an output voltage of the output power; and
   adjusting the reference voltage of the slave stackable sub-converter for current sharing in accordance with the current sharing signal.

22. The method as claimed in claim 21, wherein the reference voltage of the slave stackable sub-converter is lower than the reference voltage of the master stackable sub-converter before the reference voltage of the slave stackable sub-converter is adjusted for current sharing.

23. The method as claimed in claim 20, further comprising a feedback divider, a reference voltage, an error amplifier, a ramp signal and a modulation comparator which are configured to form a feedback loop for regulating an output voltage of the output power, the method further comprising:
   offsetting the feedback divider or an input offset of the error amplifier of the slave stackable sub-converter for current sharing in accordance with the current sharing signal.

24. The method as claimed in claim 20, further comprising:
   generating a synchronization signal by the master stackable sub-converter;
   receiving the synchronization signal by the slave stackable sub-converter; wherein the synchronization signal includes a plurality of pulses to be successively counted as a count number, wherein the synchronization signal includes a reset signal which is configured to reset and initiate the count number;
   enabling a corresponding power stage circuit to generate the output power when the count number is correlated to a corresponding phase-sequence number.

25. The method as claimed in claim 20, further comprising:
   generating a current-sense signal according the output current of the sub-converter; wherein the current-sharing signal is equal to the current-sense signal of the master stackable sub-converter.

26. The method as claimed in claim 24, wherein the stackable sub-converter is triggered on in response to a corresponding pulse of the synchronization signal.

27. The method as claimed in claim 24, wherein stackable multiphase power converter is operated in a fixed switching frequency during a heavy load condition.

\* \* \* \* \*